US008849590B2

(12) United States Patent
Miyata et al.

(10) Patent No.: US 8,849,590 B2
(45) Date of Patent: Sep. 30, 2014

(54) FLOW RATE MEASUREMENT APPARATUS AND GAS SUPPLY SYSTEM

(75) Inventors: Hajime Miyata, Nara (JP); Yasuhiro Umekage, Shiga (JP)

(73) Assignee: Panasonic Corporation, Osaka (JP)

(*) Notice: Subject to any disclaimer, the term of this patent is extended or adjusted under 35 U.S.C. 154(b) by 1267 days.

(21) Appl. No.: 12/521,446

(22) PCT Filed: Dec. 27, 2007

(86) PCT No.: PCT/JP2007/075216
§ 371 (c)(1),
(2), (4) Date: Jun. 26, 2009

(87) PCT Pub. No.: WO2008/081908
PCT Pub. Date: Jul. 10, 2008

(65) Prior Publication Data
US 2010/0326548 A1 Dec. 30, 2010

(30) Foreign Application Priority Data
Dec. 28, 2006 (JP) .............................. P2006-354265

(51) Int. Cl.
*G06F 19/00* (2011.01)
*G07C 3/00* (2006.01)
*G01F 15/06* (2006.01)
*G01F 15/075* (2006.01)

(52) U.S. Cl.
CPC *G01F 15/06* (2013.01); *G07C 3/00* (2013.01); *G01F 15/0755* (2013.01)
USPC ................ 702/45; 702/100; 702/182; 73/861

(58) Field of Classification Search
USPC ......... 702/45, 12, 50, 52, 100, 106, 179, 180, 702/181, 189; 73/861; 700/282
See application file for complete search history.

(56) References Cited

U.S. PATENT DOCUMENTS 5,971,011 A * 10/1999 Price .............................. 137/460
6,625,549 B1 * 9/2003 Nawa et al. ...................... 702/51
(Continued)

FOREIGN PATENT DOCUMENTS

JP 2001272262 A 10/2001
JP 2002071421 A 3/2002
(Continued)

OTHER PUBLICATIONS

International Search Report for International Application No. PCT/JP2007/075216, dated Mar. 11, 2008, 1 page.

(Continued)

*Primary Examiner* — Jonathan C Teixeira Moffat
*Assistant Examiner* — Hien Vo
(74) *Attorney, Agent, or Firm* — Brinks Gilson & Lione

(57) ABSTRACT

If determination is erroneous in appliance determination according to the instantaneous flow rate output from a flow rate measurement unit, a flow rate measurement apparatus registers it as an unknown appliance, rechecks the flow rate of the unknown appliance, and makes it possible to enhance the accuracy of the appliance determination. The apparatus has a flow rate measurement unit 3, a flow rate information storage unit 8 for storing the flow rate value of the flow rate measurement unit 3, a computation unit 6 for finding a difference value between the flow rate values output from the flow rate measurement unit 3, an appliance registration storage unit 7, an appliance determination unit 9 for determining an appliance, and an unknown appliance registration unit 10 for registering information according to which the appliance cannot be determined.

17 Claims, 23 Drawing Sheets

(56) References Cited

U.S. PATENT DOCUMENTS

| | | | |
|---|---|---|---|
| 2005/0171645 A1* | 8/2005 | Oswald et al. | 700/276 |
| 2006/0289623 A1* | 12/2006 | Oldham et al. | 235/375 |
| 2008/0270045 A1 | 10/2008 | Miyata | |

FOREIGN PATENT DOCUMENTS

| | | |
|---|---|---|
| JP | 2002107198 A | 4/2002 |
| JP | 2003149027 A | 5/2003 |
| JP | 2003-194331 A | 7/2003 |
| JP | 3490064 B2 | 1/2004 |
| JP | 2005257310 A | 9/2005 |
| JP | 2005-291986 A | 10/2005 |
| JP | 2007-024750 A | 2/2007 |
| JP | 2007-024753 A | 2/2007 |
| JP | 2007-024807 A | 2/2007 |
| JP | 2007-093459 A | 4/2007 |
| JP | 2007-212469 A | 8/2007 |
| JP | 2007-226283 A | 9/2007 |

OTHER PUBLICATIONS

Office Action from related Japanese Application No. 2009-119107, dated Jul. 7, 2009, 5 pages.

* cited by examiner

FIG. 20

REGISTRATION TABLE (EXAMPLE)

| APPLIANCE | START FLOW RATE Qup (L/h) | CONTROL | | STOP FLOW RATE Qstop (L/h) |
|---|---|---|---|---|
| | | FLOW RATE WIDTH Qcon (L/h) | TIME Tcon (s) | |
| FAN HEATER | 120 | 10-30 | 4 OR MORE | 100 |
| GAS TABLE | 90 | 30-80 | LESS THAN 4 | 50 |

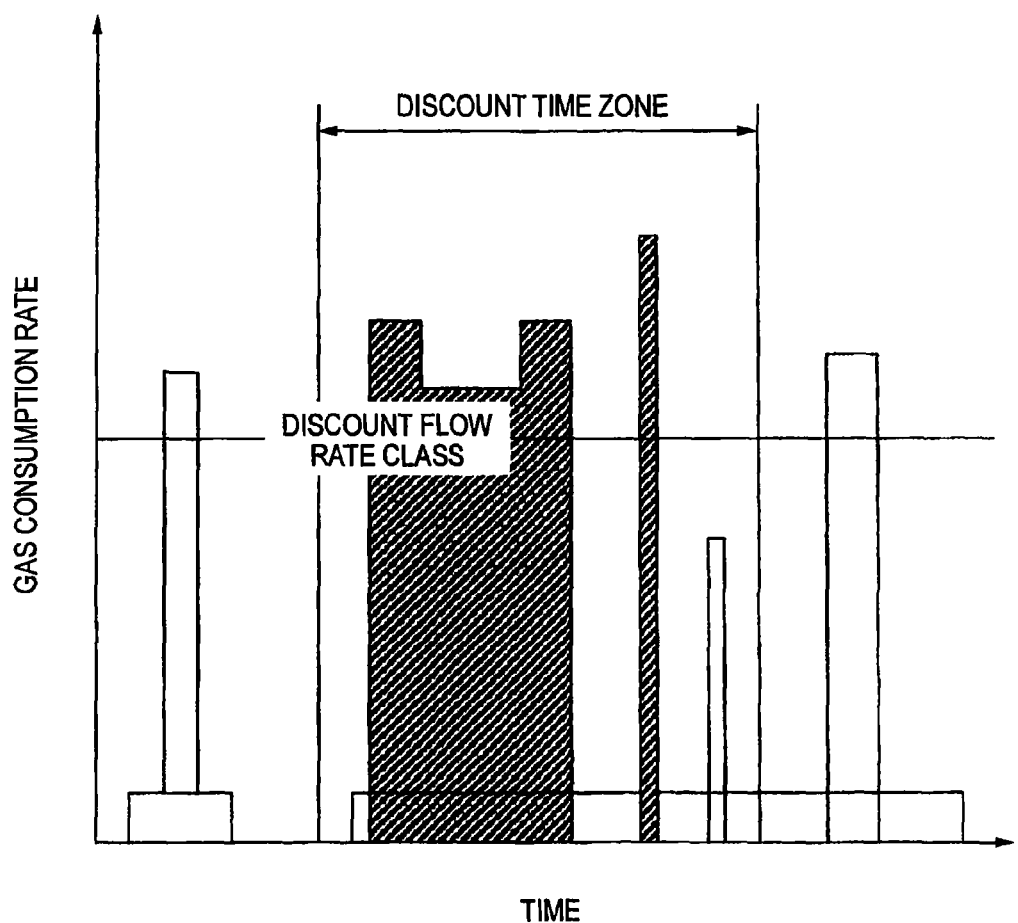

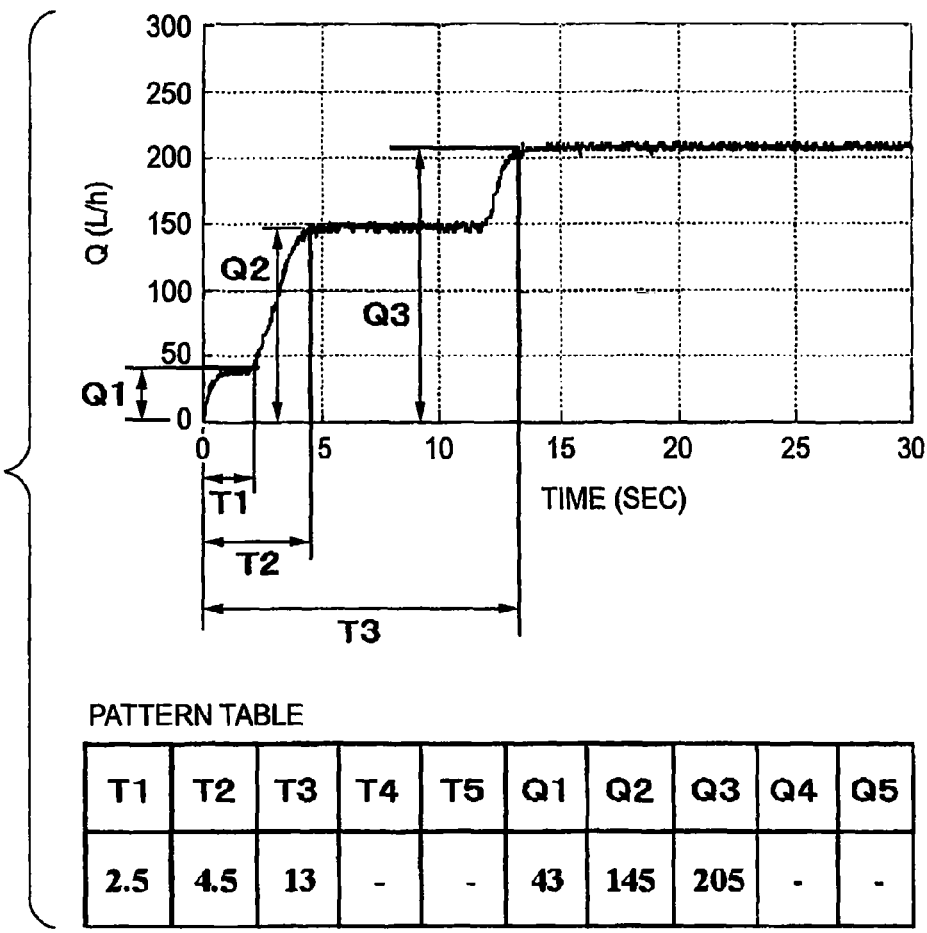

FLOW RATE MEASUREMENT APPARATUS AND GAS SUPPLY SYSTEM

This application is a national stage application of PCT/JP2007/075216 filed Dec. 27, 2007 which claims priority to JP 2006-354265 filed Dec. 28, 2006.

TECHNICAL FIELD

This invention relates to a technology of determining and detecting a gas appliance being used to provide a new fee system and service matched with a use appliance and usage such as the gas-appliance-based fee system by applying a gas meter installed in the entrance portion of a gas supplying pipe line in each household for measuring a gas flow rate.

BACKGROUND ART

Conventionally, the following configuration exists as an example of this kind of flow rate measurement apparatus (for example, refer to patent document 1):

Generally, a gas meter incorporating a gas flowmeter attached to the entrance of a gas supplying pipe line in each household.

To execute the gas-appliance-based fee system in the conventional gas meter, using a plurality of integrating meters connected to the gas meter, the integrated flow rate for use in a specific time zone and the integrated value for use of the flow rate in a specific range, namely, the flow rate by time zone and the flow rate by flow rate class are found and the fee system is determined according to the integrated values. An example of the fee system will be discussed based on FIG. 24. A predetermined discount flow rate class and a predetermined discount time zone are set the gas fee of the flow rate corresponding to the discount flow rate class and the discount time zone is to be discounted. That is, the portion hatched in FIG. 24 is discounted. In this method, however, determination of an appliance is ambiguous and it is difficult to make a fee setting easier to understand and more convenient for the consumer such as charging a fee for a specific appliance. Then, the following is proposed as a method for determining a specific appliance (for example, refer to patent document 2):

The operation of the proposal example is as follows: FIG. 25 shows a gas flow rate change pattern at the starting time of one gas appliance and reference values for pattern matching based on the pattern (pattern table). For one gas appliance, it is necessary to provide as many pattern tables as the number of flow rate change patterns of a sequence of gas occurring accompanying combustion control of the gas appliance and it becomes necessary to provide as many pattern tables as the total number of gas appliances used in each household. While change in the flow rate value measured by the flow rate measurement apparatus of the gas meter and the pattern tables are always compared, the matching target is extracted and the appliance is determined.

If a flow rate pattern other than the registered appliances occurs in the measured gas flow rate, a system of informing the user of the fact and making a request for storing the flow rate pattern also exists (for example, refer to patent document 3).

Patent document 1: Japanese Patent Laid-Open No. 2002-71421
Patent document 2: Japanese Patent Laid-Open No. 2003-149027
Patent document 3: Japanese Patent No. 3490064

DISCLOSURE OF THE INVENTION

Problems to be Solved by the Invention

In the configuration described above, if an unregistered flow rate pattern occurs, it is not determined an appliance. The flow rate pattern mentioned here contains the difference value between the gas flow rates, the change amount of the absolute flow rate, the flow rate change shape when the flow rate is plotted on the time axis, the periodicity of flow rate change, etc. The flow rate change shape contains the shape in a short time and the shape in a long time. The flow rate change shape in a short time contains overshoot, inclination (change rate), the control value, etc.

In such a case, for gas leakage, not only the case where a new gas appliance not registered is installed and operates, but also the case where determination of an appliance results in failure for some reason of secular change, etc., although the appliance is essentially registered is considered. Therefore, in such a case, it is not recognized as an appliance and therefore if change occurs in the flow rate, its information is not left and the gas use flow rate of the appliance becomes an error and uncertainty remains in the reliability of appliance determination; this is a problem.

Since various patterns as mentioned above can exist as flow rate patterns other than the registered appliances, if the user is informed whenever such a flow rate pattern occurs, intricate processing is forced upon the user each time and fruitless processing may occurs; this is a problem.

The invention is intended for solving the above-mentioned problems and it is an object of the invention to once register as an unknown appliance if an unregistered flow rate pattern occurs.

It is an object of the invention to recheck whether or not it is an already registered appliance in such a case. In this case, if it is found that it is an already registered appliance as a result of the recheck, registration as an unknown at the beginning is an error and therefore it corresponds to making an error correction.

It is an object of the invention to provide a technology capable of performing appropriate processing matched with various situations by analyzing an unknown flow rate pattern other than registered appliances and performing processing responsive to the analysis result.

Means for Solving the Problems

To solve the problems in the related arts, a flow rate measurement apparatus of the invention has a flow rate measurement unit for measuring the flow rate of a fluid flowing into a flow path; a flow rate information storage unit for storing the flow rate value measured in the flow rate measurement unit; an appliance registration storage unit for storing the flow rate value for each appliance; an appliance determination unit for making a comparison between a flow rate pattern of the flow rate value measured in the flow rate measurement unit and a flow rate pattern of an appliance determination value stored in the appliance registration storage unit and determining the use state of an appliance connected to the downstream side of the flow rate measurement unit; and an unknown appliance registration unit, if there is a flow rate pattern according to which the appliance determination unit cannot determine an appliance based on information in the appliance registration storage unit, for registering the information as unknown data.

ADVANTAGES OF THE INVENTION

The flow rate measurement apparatus of the invention has the unknown appliance registration unit for registering information according to which the appliance determination unit cannot determine an appliance; if flow rate change occurs and determination of an appliance for it is erroneous, the determination can be handled as a miscellaneous appliance as an unknown appliance and further if an unknown appliance exists, the accuracy of appliance determination can be enhanced by rechecking using estimation as to what the unknown appliance is based on history data. Since appliance determination is made with good accuracy, a new fee menu, etc., provided by the gas supply company, etc., can be used. The appliance determination function can be updated without changing the specifications of a gas meter, so that it is also made possible to easily maintain the device function in the future. For occurrence of unknown data, a determination is made for the predetermined time period according to the predetermined condition, whereby a gas use situation such as introduction of a new appliance, combined use of appliances, gas leakage, etc., can be determined and appropriate processing matched with various situations can be performed.

BRIEF DESCRIPTION OF THE DRAWINGS

FIG. 20 is a drawing to show an example of registration data in a fifth embodiment of the invention.

FIG. 24 is a conceptual drawing of a determination method of a flow rate measurement apparatus in a related art.

FIG. 25 is a data configuration drawing of a determination method of a flow rate measurement apparatus in a related art.

DESCRIPTION OF REFERENCE NUMERALS

Figure 1:
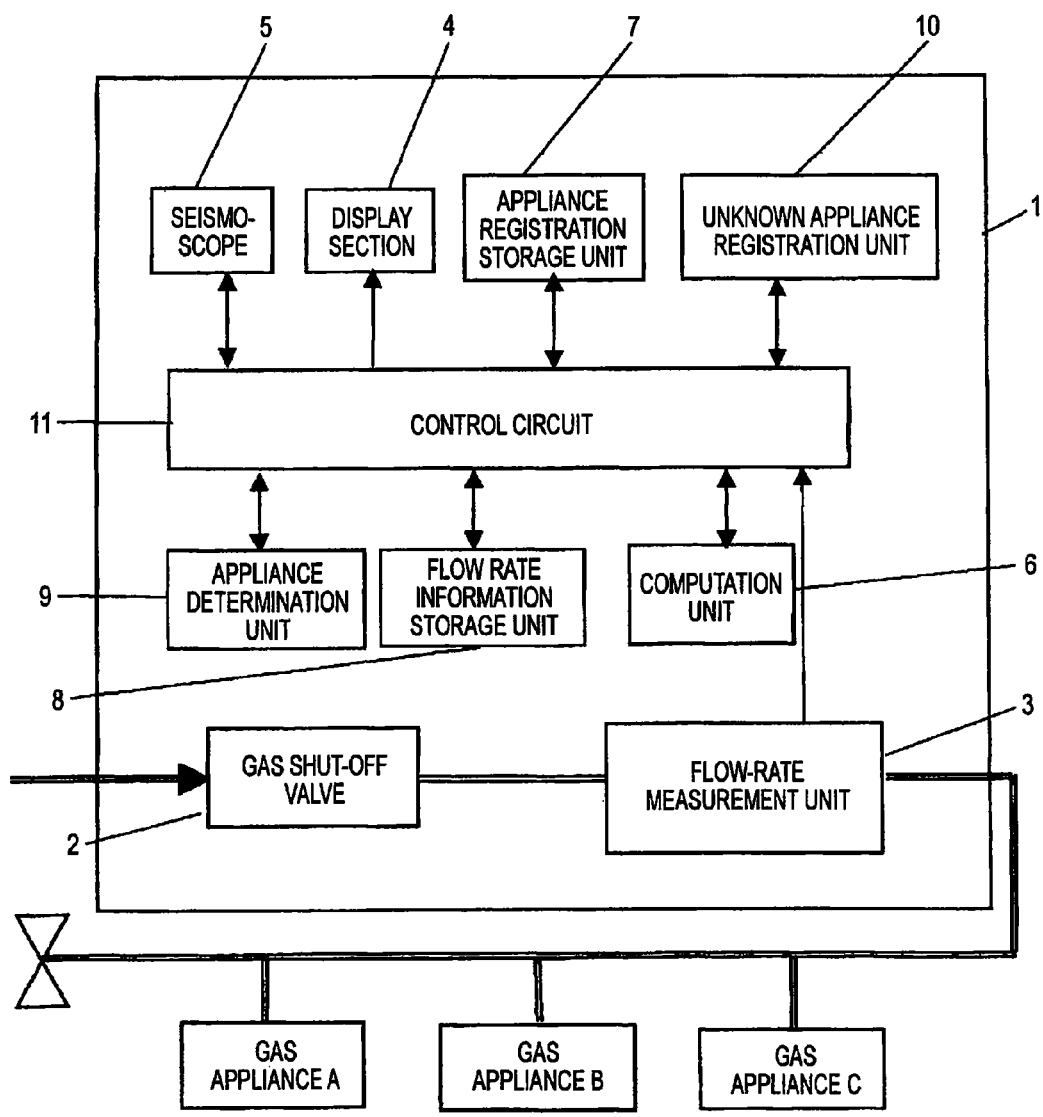
FIG. 1 is a block diagram of a flow rate measurement apparatus in a first embodiment of the invention.

1 Flow rate measurement apparatus
2 Gas shut-off valve
3 Flow rate measurement unit
4 Display section
5 Seismoscope
6 computation unit
7 Appliance registration storage unit
8 Flow rate information storage unit
9 Appliance determination unit
10 Unknown appliance registration unit
11 Control circuit
12 Measurement flow path
13, 14 Ultrasonic transceiver
15 By-appliance flow rate integration unit
16 Recheck unit

BEST MODE FOR CARRYING OUT THE INVENTION

A first aspect of the invention provides a configuration having a flow rate measurement unit for measuring the flow rate of a fluid flowing into a flow path; a flow rate information storage unit for storing the flow rate value measured in the flow rate measurement unit; an appliance registration storage unit for storing the flow rate value for each appliance; an appliance determination unit for making a comparison between a flow rate pattern of the flow rate value measured in the flow rate measurement unit and a flow rate pattern of an appliance determination value stored in the appliance registration storage unit and determining the use state of an appliance connected to the downstream side of the flow rate measurement unit; and unknown appliance registration unit, if there is a flow rate pattern according to which the appliance determination unit cannot determine an appliance based on information in the appliance registration storage unit, for registering the information as unknown data, so that if an appliance that cannot be determined occurs, the information can be left as an unknown appliance and thus whether or not a determination error occurs can be determined immediately.

In a second aspect of the invention, particularly in the first aspect of the invention, a by-appliance flow rate calculation unit for calculating the flow rate for each appliance based on the determination result of the appliance determination unit is included and the use flow rate of each determined appliance can be found.

In a third aspect of the invention, particularly, the unknown appliance registration unit in the first aspect of the invention registers the flow rate pattern resulting in an unknown appliance in the appliance registration storage unit as a new appliance, so that if a new appliance is used and becomes an unknown appliance because a waveform pattern is not known, the data is registered, whereby it is made possible to determine the appliance when the appliance is used next time.

In a fourth aspect of the invention, particularly in the first aspect of the invention, a recheck unit is included for rechecking based on the data in the flow rate information storage unit if registration data exists in the unknown appliance registration unit; according to information of occurrence of an unknown appliance, recheck is performed for determining the appliance becoming the unknown appliance, whereby if one determination results in failure, redetermination can be made and thus the accuracy of appliance determination can be enhanced.

In a fifth aspect of the invention, particularly in the fourth aspect of the invention, the recheck unit rechecks each time the information in the unknown appliance registration unit is newly updated; a determination is made each time an unknown appliance occurs, so that recheck can be performed without leaving much history data.

In a sixth aspect of the invention, particularly in the fourth aspect of the invention, the recheck unit rechecks when registration data exists in the unknown appliance registration unit and the flow rate value output from the flow rate measurement unit becomes roughly zero, so that when all appliances stop, a break is set and thus no appliances are operating and all appliances definitely stop at the point in time and thus long continuation of erroneous determination can be easily circumvented.

In a seventh aspect of the invention, particularly in the fourth aspect of the invention, the recheck unit rechecks every given time if registration data exists in the unknown appliance registration unit, whereby there is the advantage that the storage capacity required for leaving history data becomes constant, and it becomes easy to determine the specifications of the hardware configuration of memory required for computation, etc.

A first aspect of the invention provides a configuration having a flow rate measurement unit for measuring the flow rate of a fluid flowing into a flow path; a flow rate information storage unit for storing the flow rate value measured in the flow rate measurement unit; an appliance registration storage unit for storing the flow rate value for each appliance; an appliance determination unit for making a comparison between a flow rate pattern of the flow rate value measured in the flow rate measurement unit and a flow rate pattern of an appliance determination value stored in the appliance registration storage unit and determining the use state of an appliance connected to the downstream side of the flow rate measurement unit; an unknown appliance registration unit, if there is a flow rate pattern according to which the appliance determination unit cannot determine an appliance based on information in the appliance registration storage unit, for registering the information as unknown data; and a correspondence processing determination unit for determining the unknown data for a predetermined time period under a predetermined condition and determining correspondence processing. Accordingly, an unknown flow rate pattern other than the registered appliances is analyzed and processing responsive to the analysis result is performed, so that fruitless processing can be decreased and appropriate processing matched with various situations can be performed.

In a ninth aspect of the invention, particularly in the eighth aspect of the invention, the correspondence processing determination unit uses a determination condition corresponding to each occurrence cause of a specific use state as the predetermined condition and determines the unknown data in a predetermined time period suited for each determination condition. Accordingly, appropriate processing can be executed in response to the occurrence cause of each use state, such as leakage of a fluid, introduction of a new appliance, or combined use of appliances, for example, and thus can be utilized effectively for safety and maintenance management of appliances and flow paths, fee integration, etc.

In a tenth aspect of the invention, particularly in the eighth aspect of the invention, the correspondence processing determination unit uses a leakage determination condition as a first predetermined condition and has a leakage determination unit for determining leakage of a fluid in the flow rate pattern of the unknown data in a first predetermined time period suited for the leakage determination condition and if the leakage is determined, determines safety processing as the correspondence processing. Accordingly, leakage of a fluid can be determined at an appropriate timing and corresponding safety processing of shutting off the flow path, sending a notification, etc., can be executed.

In an eleventh aspect of the invention, particularly in the eighth aspect of the invention, the correspondence processing determination unit uses a new appliance determination condition as a second predetermined condition and has a new appliance determination unit for determining a new appliance in the flow rate pattern of the unknown data in a second predetermined time period suited for the new appliance determination condition and if the new appliance is determined, determines maintenance processing as the correspondence processing. Accordingly, introduction of a new appliance can be determined at an appropriate timing and corresponding maintenance processing of notifying the management center, registration of the new appliance, etc., can be executed.

In a twelfth aspect of the invention, particularly in the eighth aspect of the invention, the correspondence processing determination unit uses a combined use determination condition as a third predetermined condition and has a combined use determination unit for determining combined use of appliances in the flow rate pattern of the unknown data in a third predetermined time period suited for the combined use determination condition and if the combined use is determined, determines combined use processing as the correspondence processing. Accordingly, accordingly, combined use of appliances can be determined at an appropriate timing and corresponding combined use processing of integration processing of the gas flow rate by appliance, by function at the combined use time, etc., can be executed.

In a thirteenth aspect of the invention, particularly the flow rate information storage unit in the first aspect of the invention includes an information compression unit for compressing information of the flow rate value in a time axis direction and storing the compressed information, so that if the history data is left long, only the actual flow rate change portion may be left and thus the capacity of the storage device can be reduced drastically.

In a fourteenth aspect of the invention, particularly the flow rate measurement unit in the first aspect of the invention uses an ultrasonic flowmeter as instantaneous flow rate measurement unit, so that instantaneous measurement every given time can be conducted easily.

In a fifteenth aspect of the invention, particularly in a flow rate measurement apparatus in the first aspect of the invention, a gas supply system using the flow rate measurement apparatus connected to a household gas supplying pipe line is constructed, so that a new fee menu, etc., provided by the gas company can be used and the gas sale and the gas appliance sale can be expanded.

Embodiments of the invention will be discussed below with reference to the accompanying drawings: The invention is not limited by the embodiments.

First Embodiment

FIG. 1 shows the configuration of a flow rate measurement apparatus in a first embodiment of the invention.

In FIG. 1, numeral 1 denotes a flow rate measurement apparatus. The flow rate measurement apparatus 1 is provided at a midpoint in a gas supplying pipe line and one or more gas appliances installed in each customer home are connected to downstream piping.

The flow rate measurement apparatus contains a gas shut-off valve 2 and a gas flow rate measurement unit 3 provided in a gas flow path connected to a gas pipe, a display section 4 for performing computation processing of a signal from the flow rate measurement unit 3 and displaying the use gas flow rate, a seismoscope 5 for detecting vibration of an earthquake, etc., a computation unit 6, an appliance registration storage unit 7, a flow rate information unit 8, an appliance determination unit 9, and an unknown appliance registration unit 10 according to the invention, a control circuit 11 for performing centralized control processing of the functions, etc., and a battery (not shown) as a power source of the components.

An appliance determination value used as a criterion to determine whether or not flow rate change occurs and a change point determination value at a change point (start time, control time, stop time, etc.) in a sequence of combustion states of each gas appliance are recorded in the appliance registration storage unit 7. In the invention, semiconductor memory is used as the appliance registration storage unit 7 for storing the recorded data, but any other record medium such as a magnetic record medium can also be used if record can be added and rewritten.

For the flow rate measurement unit 3 of the invention, an ultrasonic measurement unit is used. However, as the measurement system, any other flow rate measurement system can also be used if continuous measurement can be conducted in a constant cycle in a short time, such as a fluidic system.

Figure 2:
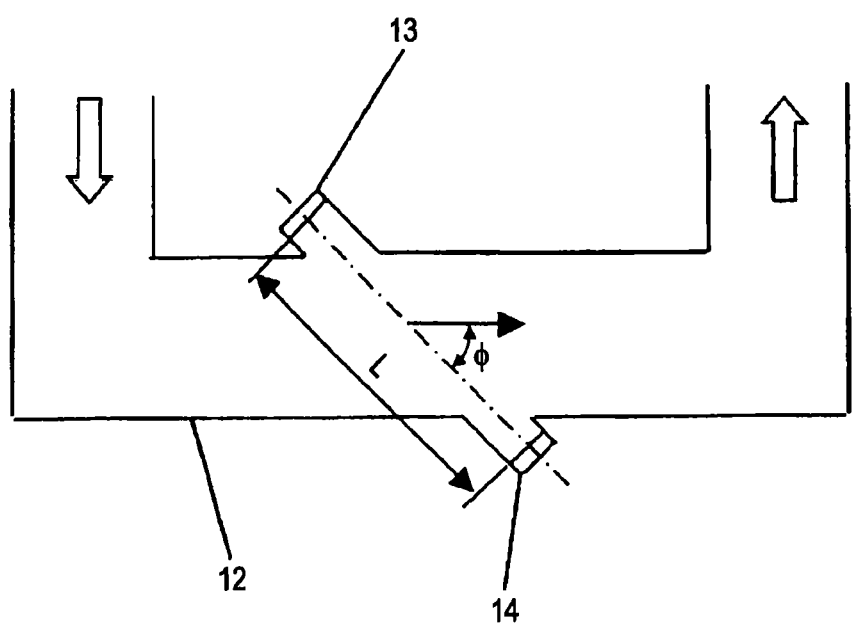
FIG. 2 is a configuration drawing of a flow rate measurement section in the first embodiment of the invention.

The operation is as follows:

To begin with, ultrasonic flow velocity measurement will be discussed based on FIG. 2. A measurement flow path 12 has a rectangular cross section and a pair of ultrasonic transceivers 13 and 14 sandwiching the measurement flow path 11 is opposed to each other slantingly having angle $\phi$ on upstream and downstream sides of the flow path and is attached to wall faces in the right-angle direction to the gas flow direction of the measurement flow path 12. An ultrasonic wave is transmitted and received alternately between the ultrasonic transceivers 13 and 14 and the difference between the propagation times of the ultrasonic wave in the forward direction and the opposite direction to the flow of a fluid is measured at given time intervals and is output as a propagation time difference signal. Upon reception of the propagation time difference signal, a calculation unit (not shown) calculates the flow velocity and the flow rate of the measured fluid. A computation expression is as follows:

In FIG. 2, letting L be measurement distance, $t_1$ be propagation time from upstream, $t_2$ be propagation time from downstream, and C be sound velocity, flow velocity V is found according to the following expression (1):

$$V = (L/2 \cos \phi) \cdot ((1/t_1) - (1/t_2))$$ Expression (1)

The measurement time interval can be set in the range in which an ultrasonic wave can be transmitted and received; in the invention, measurement is conducted at two-second intervals. The time interval can be further lessened on measurement principles and some gas appliances are started in a shorter time than two seconds and thus lessening the measurement time interval is advantageous in the viewpoint of making instantaneous apparatus determination, but there is a problem in that consumption of the battery increases if the measurement interval is shortened. If the measurement time interval becomes two-digit-order second interval equivalent to that of a membrane system used in a conventional gas meter, it becomes difficult to make determination seeing the difference in flow rate change of the algorithm of the invention. Therefore, in the invention, measurement is conducted at two-second intervals as a good balance time from the viewpoints of the cost and appliance determination performance.

Next, a determination procedure of the operation state of a gas appliance will be discussed based on FIG. 3.

In the flow rate measurement apparatus 1, the gas flow rate is measured at two-second intervals as mentioned above and the data is sent to the computation unit 6 and the flow rate value is differentiated and the result is output as difference data between flow rates every two seconds.

The difference data is sent to the appliance determination unit 9 and is compared with the change determination value registered in the appliance registration storage unit 7. If the difference value exceeds the comparison determination value, it is determined that state change occurs in the gas appliance. If the change is detected, to further determine what state which gas appliance is in, the appliance determination unit 9 compares the value with the change value by state of each gas appliance registered in the appliance registration storage unit 7 and determines the appliance and determines the state of the appliance.

However, if flow rate change of an appliance not registered in the appliance registration storage unit 7 is detected or, for example, if a registered appliance does not act as registered for some reason of secular change, etc., although it is rare, there is a possibility that the appliance may be determined an unknown appliance. In the embodiment, if the appliance is recognized as an unregistered appliance, it is assumed that an unknown appliance exists and information is registered in the unknown appliance registration unit 10 as shown in FIG. 3.

If registration information exists in the unknown appliance registration unit 10, the flow rate change at the time is newly registered in the appliance registration storage unit 7. Accordingly, if similar flow rate change occurs next time, it is made possible to recognize the appliance as a registered appliance and if a new appliance is used, automatically existence of the appliance can be registered.

Figure 4:
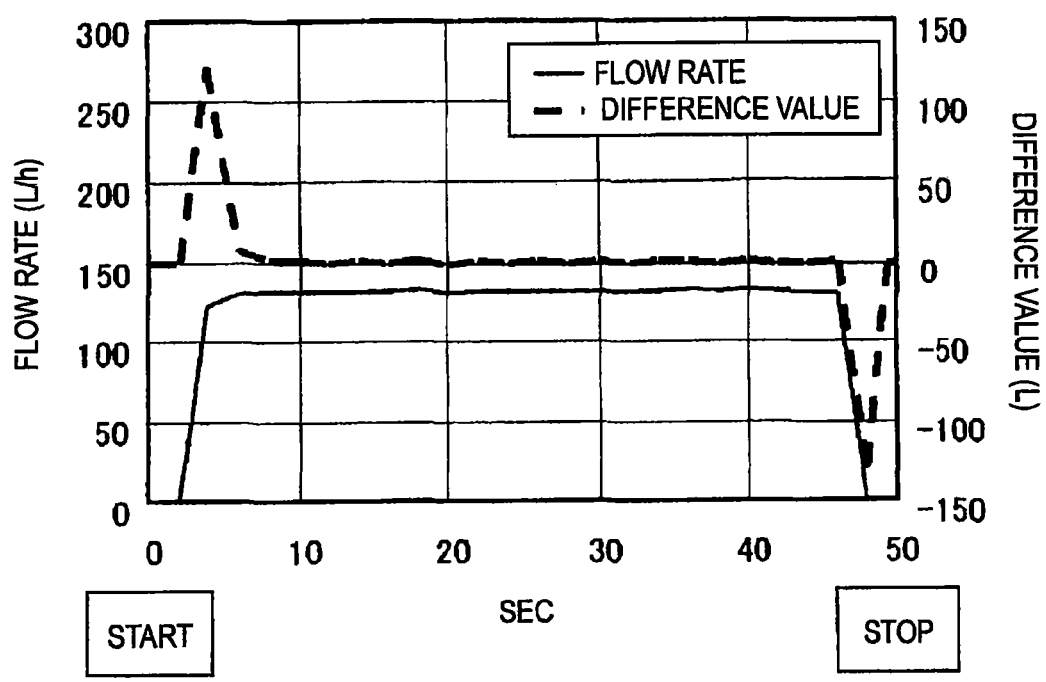
FIG. 4 is a characteristic drawing of flow rates and computation values in the first embodiment of the invention.

FIG. 4 shows gas flow rate change and difference value change when an actual gas appliance is used.

In the characteristic drawing of FIG. 4, the solid line indicates the flow rate value of gas measured by the flow rate measurement unit 3 and the dashed line indicates the derivative at the time, namely, the difference value every two seconds. When the gas appliance is started, the difference value is represented having a peak on the plus side; when the gas appliance is stopped, the difference value is represented having a peak on the minus side.

Figure 3:
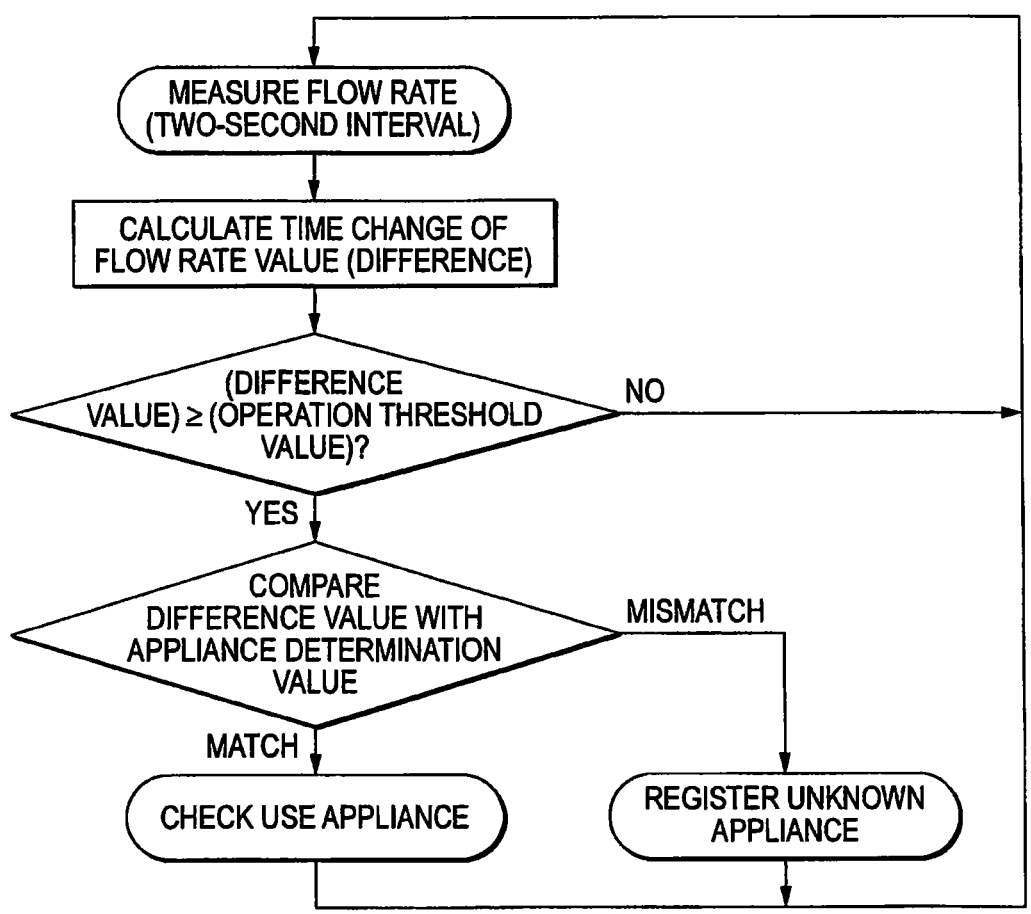
FIG. 3 is a flowchart of determination operation (1) in the first embodiment of the invention.

In the embodiment described above, first if difference value change is equal to or larger than one predetermined value (change determination value), it is assumed that change occurs and the appliance is determined and state change is determined at the next step as shown in FIG. 3. If a determination is made as to a previously registered limited appliance or if the processing speed is high and the difference value data from the computation unit 6 can be compared intact with change point determination value data of all gas appliances within two seconds, changed gas appliance and state can also be determined directly from the difference value.

Figure 5:
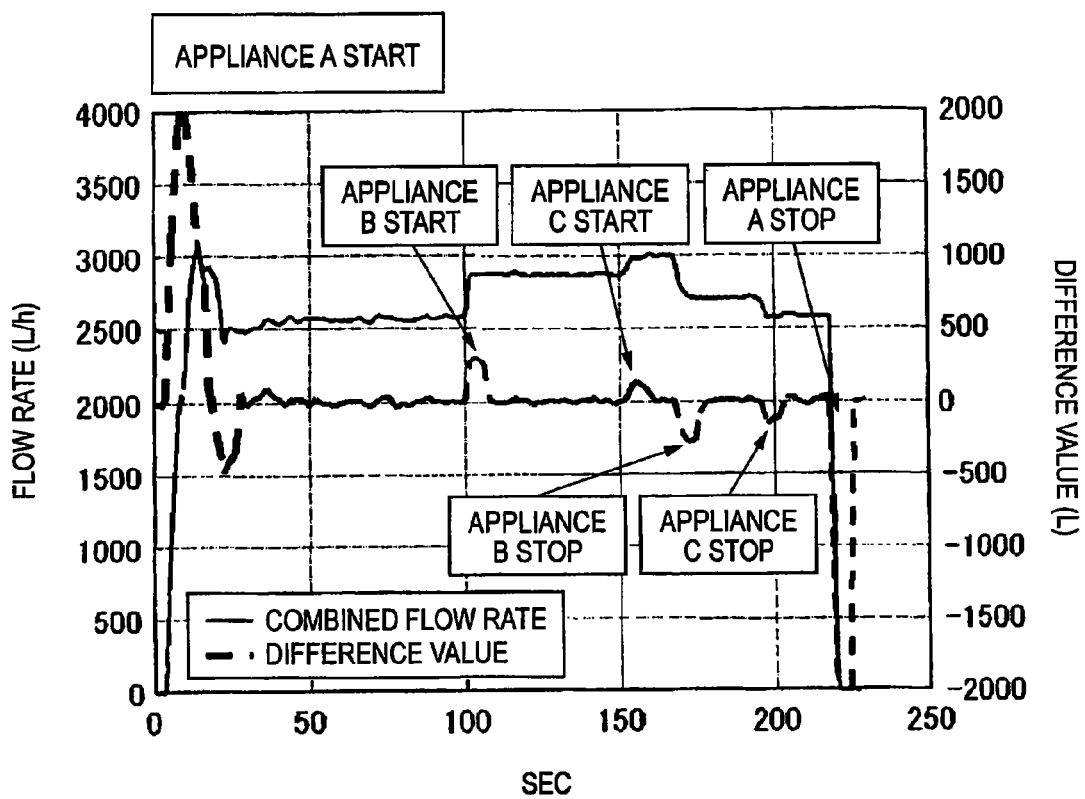
FIG. 5 is a characteristic drawing of flow rates and computation values in the first embodiment of the invention.

FIG. 5 shows flow rate values and difference values when three appliances (A, B, and C) are used at the same time on a graph. It can be acknowledged that change at the start time and the stop time of the three appliances can be read.

As determined information, any means can be used if the information can be checked, such as display on the display section through the control circuit 11 from within the storage unit or data transfer to an external terminal (not shown).

Figure 6:
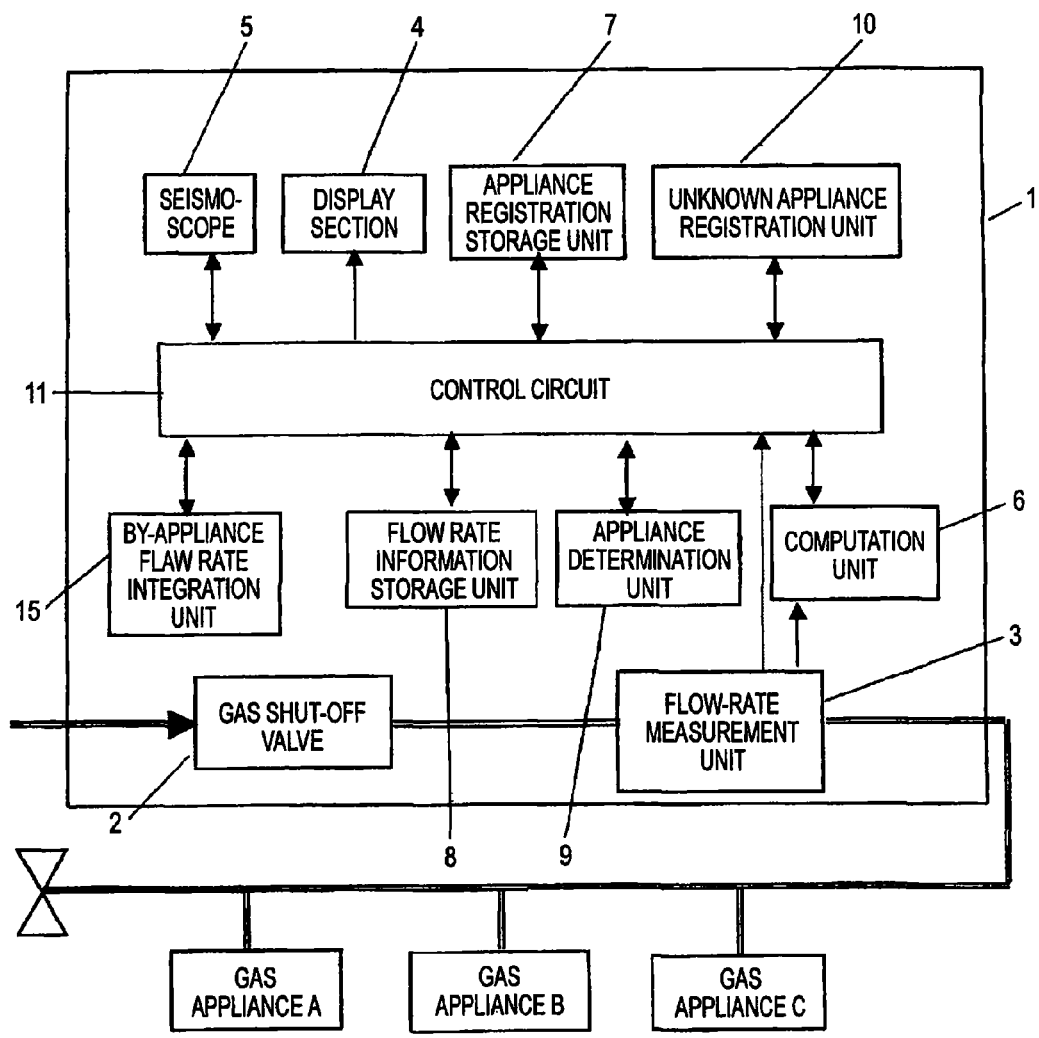
FIG. 6 is a block diagram of the flow rate measurement apparatus in the first embodiment of the invention.
Figure 7:
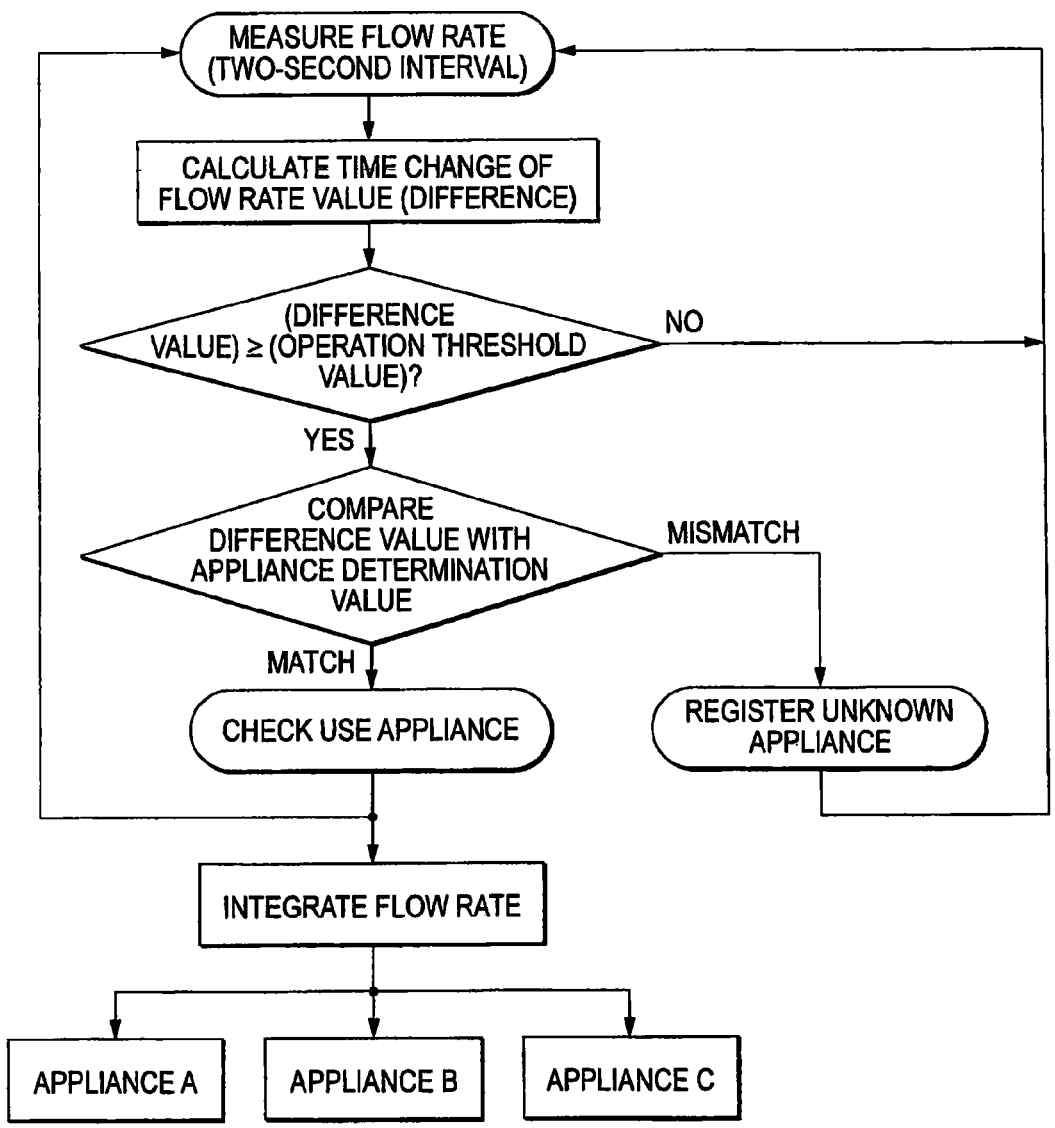
FIG. 7 is a flowchart of determination operation in the first embodiment of the invention.

In a configuration wherein the flow rate measurement apparatus 1 has a by-appliance flow rate integration unit 15 as shown in FIG. 6, the change value of each gas amount can be integrated and use gas change by device and function can be found according to a work flow shown in FIG. 7 and the gas use amount by device, by function can be calculated.

Further, a fee computation unit for an individual flow rate is provided so that an individual fee can be charged for the use gas flow rate by device and function, whereby an arbitrary fee by appliance and function can also be calculated according to the setting of the gas company.

As an example of service that can be provided, it is considered that a discount system is applied only to heating appliances as a new gas fee system; for the consumer, the gas fee seems to be undervalued and as a heater is used for a long time, the gas sale of the gas company can be expanded and further the sale of devices of the gas company can also be increased.

Second Embodiment

Figure 8:
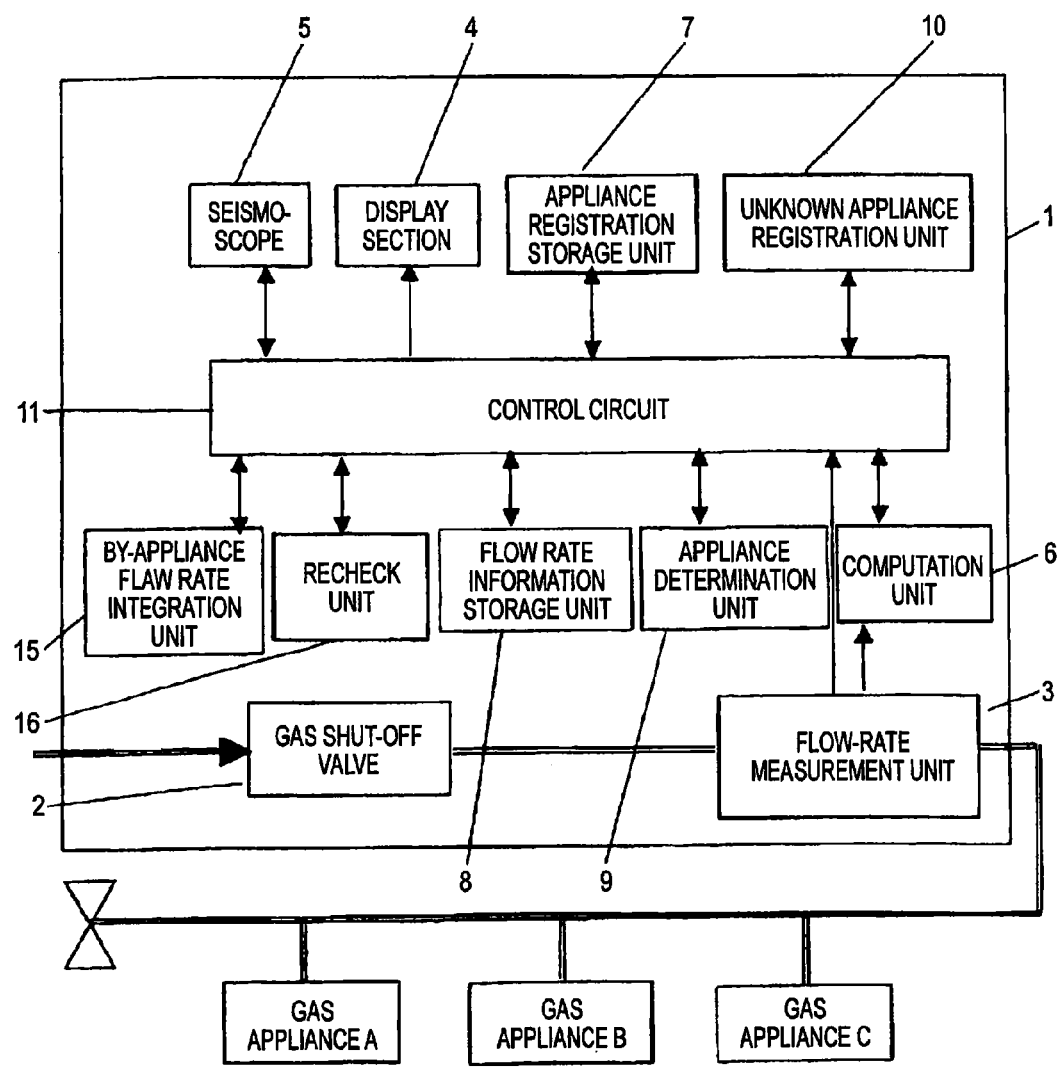
FIG. 8 is a block diagram of a flow rate measurement apparatus in a second embodiment of the invention.

FIG. 8 shows the configuration of a flow rate measurement apparatus in a second embodiment of the invention.

The second embodiment differs from the first embodiment in that it has a recheck unit 16. The basic configuration of the flow rate measurement apparatus is similar to that of the first embodiment and therefore will not be discussed again.

Figure 9:
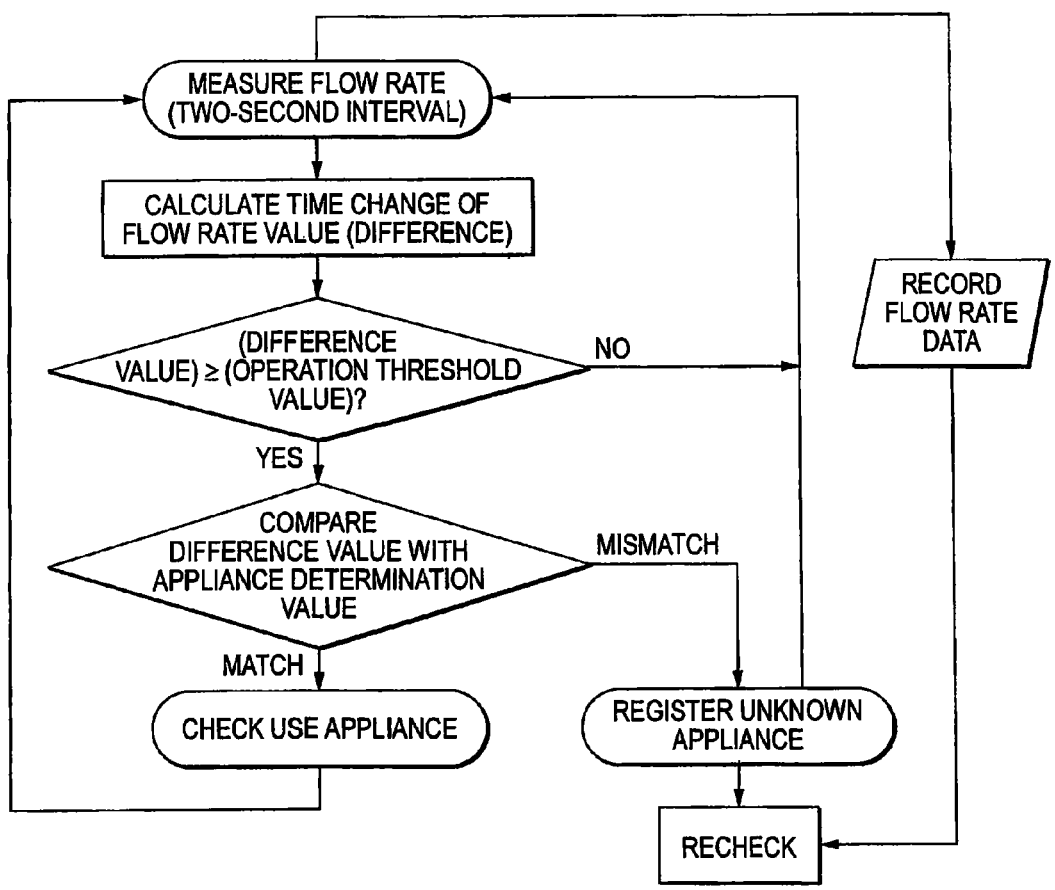
FIG. 9 is a flowchart of determination operation in the second embodiment of the invention.

The operation is as follows:

As shown in FIG. 9, if the appliance determination result of an appliance determination unit 9 is an unknown appliance, information is registered in an unknown appliance registration unit 10. If the corresponding data exists in the unknown appliance registration unit 10, the recheck unit 16 rechecks which appliance it is by comparing the determination of the portion of unknown appliance, for example, by widening the margin width for flow rate change at the starting time and the registration value, etc., based on the data record of the flow rate in a flow rate information record unit 8. If the appliance can be determined by rechecking, unknown appliance registration is erased and the start appliance at the point in time is determined.

Figure 10:
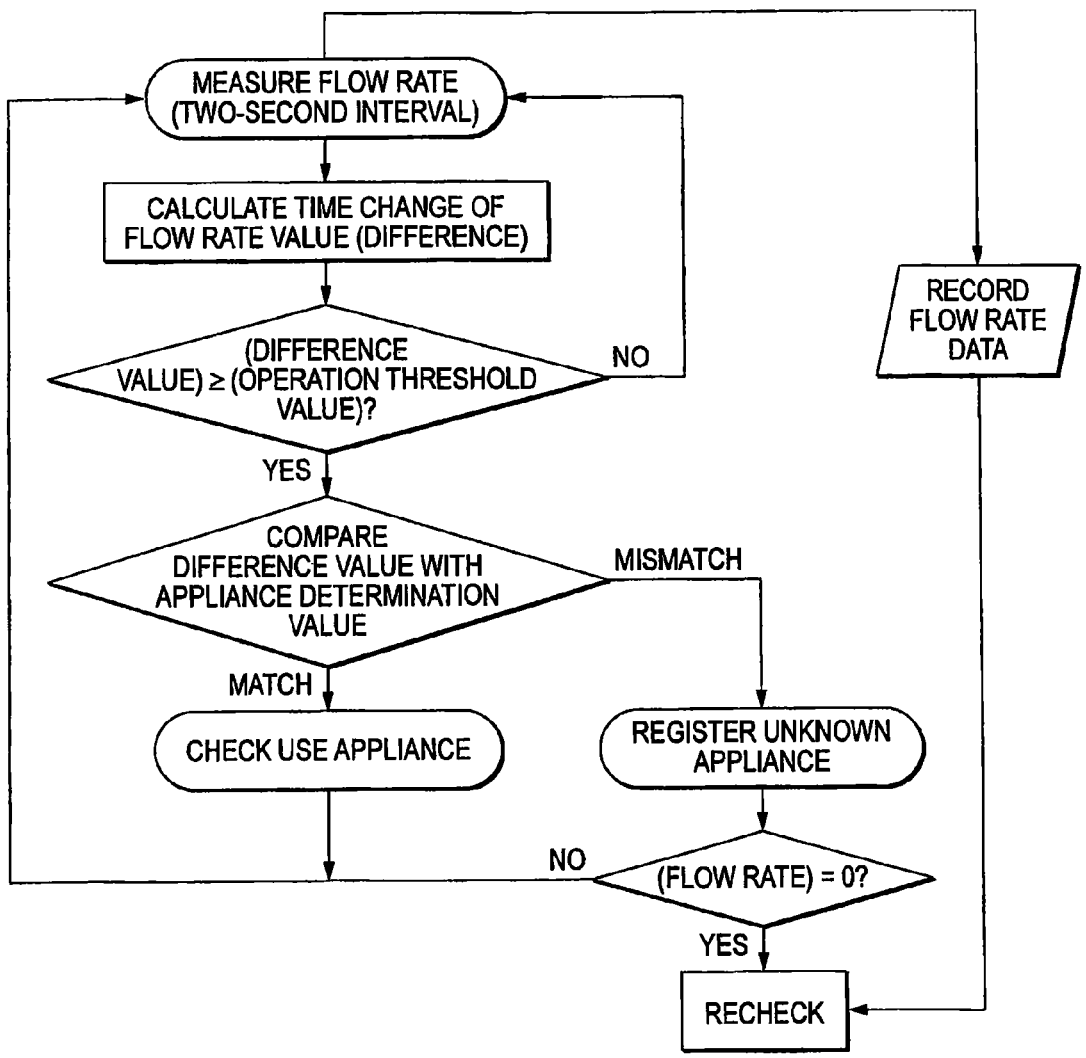
FIG. 10 is a flowchart of determination operation in the second embodiment of the invention.

As shown in FIG. 10, if unknown appliance registration exists in the unknown appliance registration unit 10, when the measurement flow rate becomes zero, the unknown appliance registration is rechecked. When the flow rate is thus zero, obviously all appliances stop and thus unknown appliances to the point in time are again determined and the start appliance is rechecked and the use flow rate used so far by each appliance can be determined. Thus, when the use flow rate is determined, the past flow rate data becomes unnecessary and the storage information of the flow rate can be cleared, so that the memory for storing the flow rate information can be used effectively.

Figure 11:
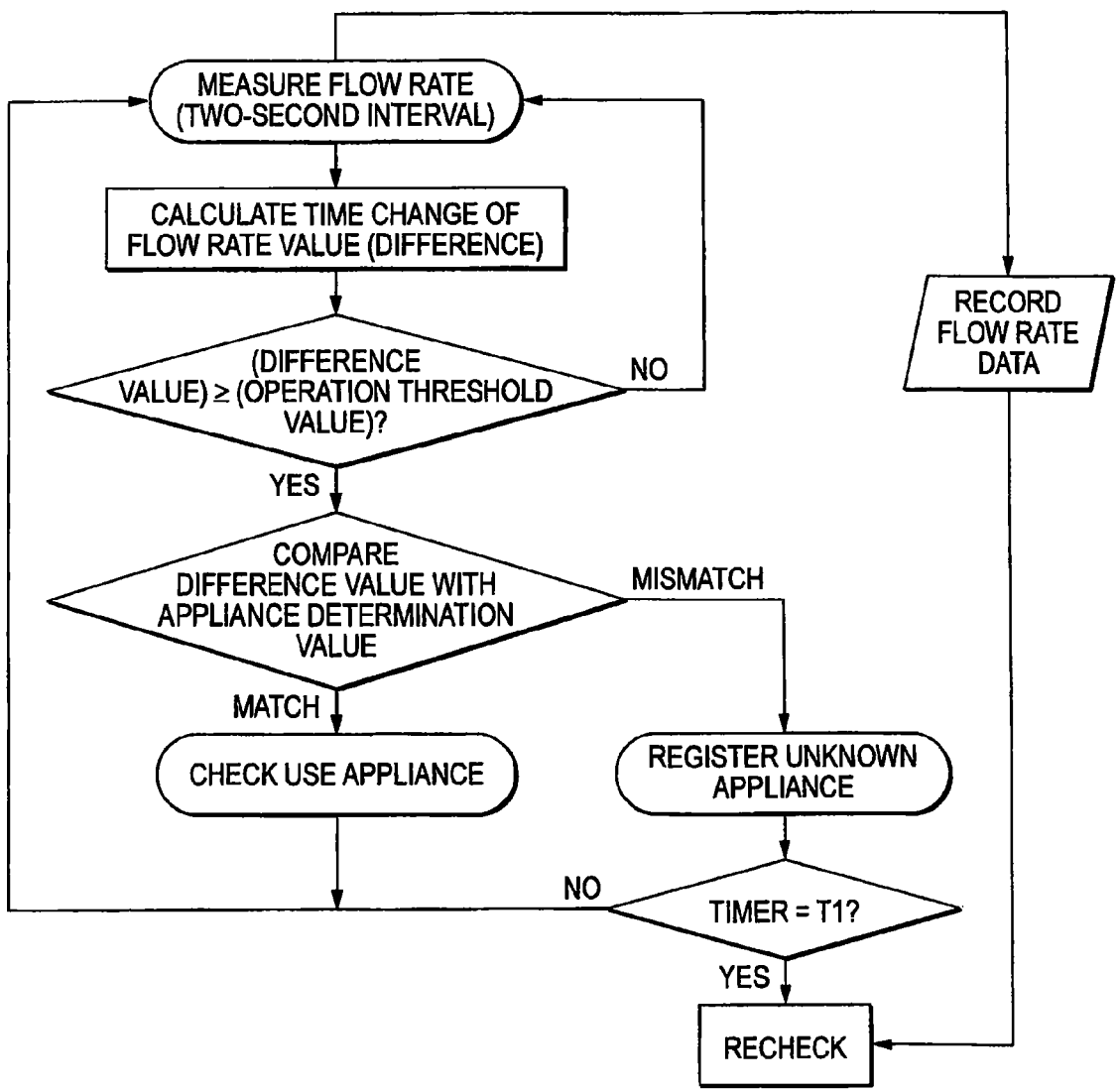
FIG. 11 is a flowchart of determination operation in the second embodiment of the invention.

If the flow rate measurement apparatus has timer (not shown) and registration data exists in the unknown appliance registration unit 10 every given time, it is rechecked and the flow rate of each use appliance is determined as shown in FIG. 11. Accordingly, only the preset flow rate data needs to be left. Thus, considering the configuration of the recheck time, the memory usable specification can be changed and a configuration with a small capacity of memory is also made possible.

Figure 12:
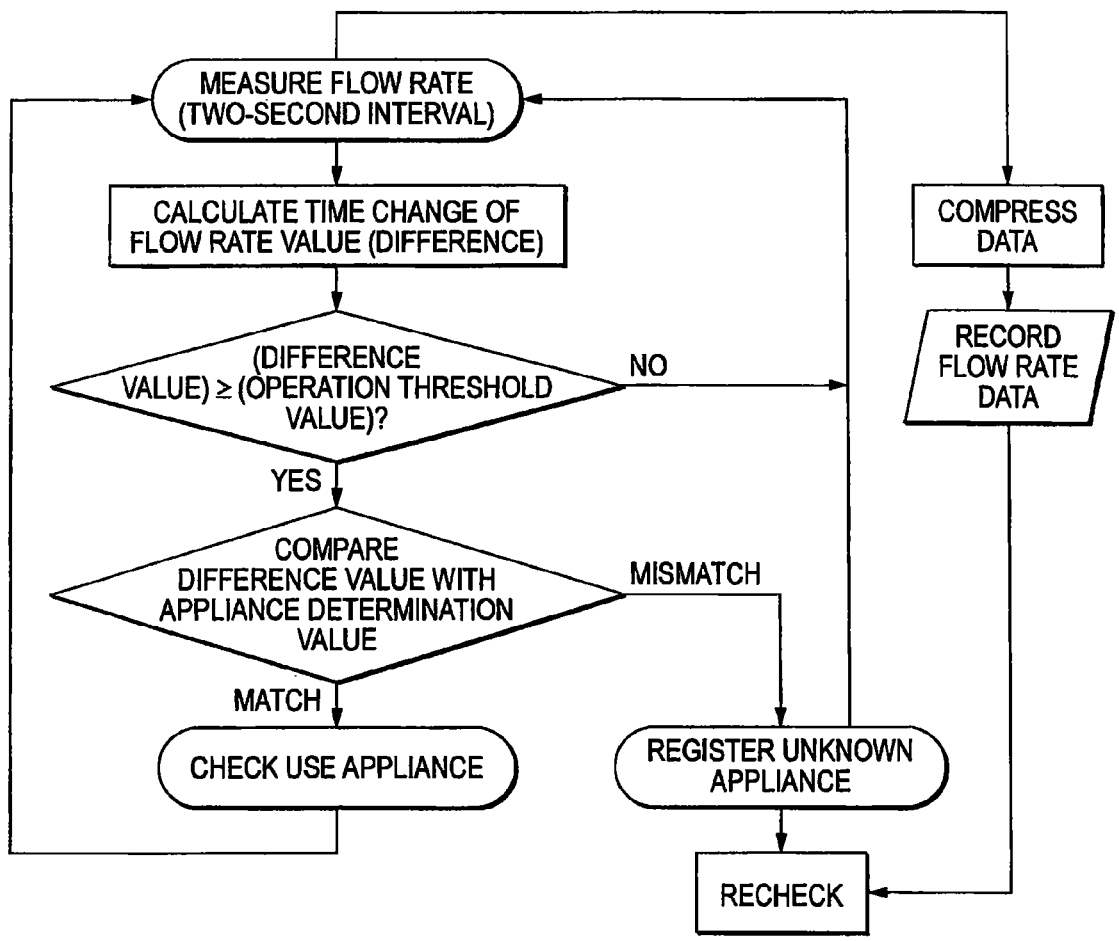
FIG. 12 is a flowchart of determination operation in the second embodiment of the invention.

As the data left in the flow rate information storage unit 8 used in the invention, the data at two-second time intervals is all stored, but the flow rate data in the portion where the flow rate does not change is not necessary and thus in the portion, data can be thinned out and compressed as shown in FIG. 12. Accordingly, the storage area of the memory can be reduced.

Third Embodiment

In the following embodiment, condition determination processing and correspondence processing responsive to the determination result when an unknown flow rate pattern occurs will be discussed in addition to the operation of the first or second embodiment described above. The configuration of a flow rate measurement apparatus is similar to that shown in FIG. 6.

Figure 13:
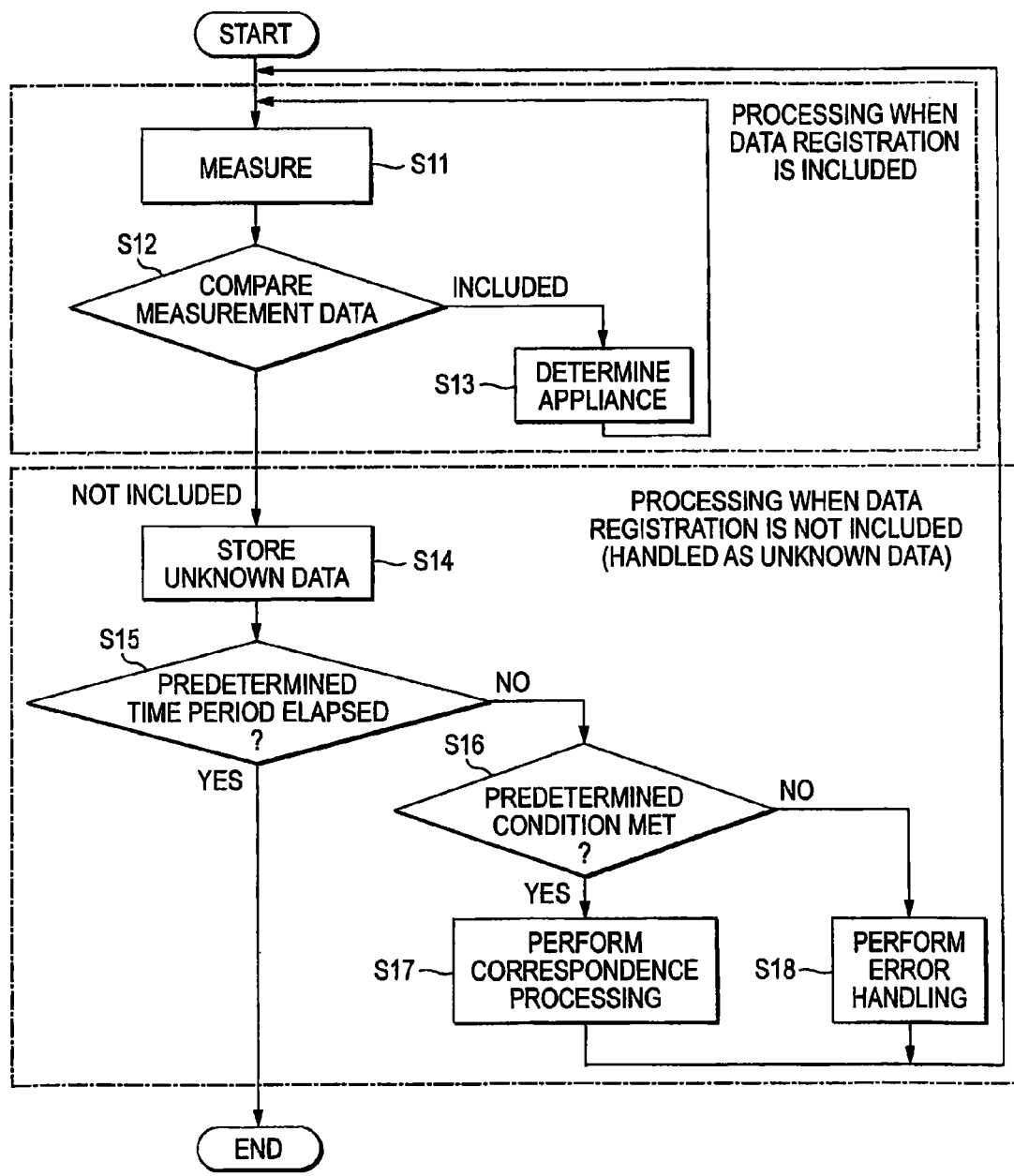
FIG. 13 is a flowchart to show processing when an unknown flow rate pattern occurs in a third embodiment of the invention.

FIG. 13 is a flowchart to show processing when an unknown flow rate pattern occurs in a third embodiment. In the embodiment, at step S11, a flow rate measurement unit 3 measures the gas flow rate and at step S12, an appliance determination unit 9 checks whether or not the flow rate pattern of the measurement data matches the flow rate pattern of a registered appliance. If the flow rate pattern matches the flow rate pattern of an already registered appliance, the appliance determination unit 9 performs appliance determination processing at step S13 and a control circuit 11 causes corresponding processing to be executed for each appliance in response to the determination result. For example, to calculate the appliance-based fee, by function, etc., the control circuit causes a by-appliance flow rate integration unit 15 to perform integration processing of the gas flow rate (gas use amount) by appliance, by function. Then, the process returns to step S11 and the measurement processing is continued.

If the flow rate pattern does not match the flow rate pattern of a registered appliance, the appliance determination unit 9 assumes that the flow rate pattern is the flow rate pattern of an unknown appliance and handles it as unknown data and the flow rate pattern data of an unknown appliance is stored by the unknown appliance registration unit 10 at step S14. Thus, an unknown flow rate pattern not registered is once registered as the flow rate pattern data of an unknown appliance and then whether or not the flow rate pattern data of an unknown appliance meets each situation stipulated according to a predetermined condition corresponding to each occurrence cause.

At this time, the appliance determination unit 9 makes determination for a predetermined time according to a predetermined condition and determines processing matched with each situation of the occurrence cause of unknown data. That is, at step S15, whether or not a predetermined time period has elapsed is determined and if the predetermined time period does not elapse, whether or not the predetermined condition is met is checked at step S16. If the predetermined condition is met within the predetermined time period, at step S17 the control circuit 11 executes correspondence processing matched with the situation of the predetermined condition for the flow rate pattern data of the unknown appliance. Then, the process returns to step S11 and the measurement processing is continued. On the other hand, if the predetermined condition is not met at step S16, at step S18 the control circuit 11 assumes that the pattern is unknown data which does not correspond to any, and performs error handling such as informing a management center or the user of the fact. Then, the process returns to step S11 and the measurement processing is continued.

In the third embodiment, the case where gas leakage is determined and corresponding processing such as safety processing is performed is shown as a first example of the situation of the occurrence cause of unknown data. In this case, a leakage determination condition such as determination of minute leakage over a long term without meeting any other predetermined condition such as stability of flow rate, pressure correlation between the gas pressure detected with a pressure sensor and the flow rate, or introduction of a new appliance is used as a first predetermined condition. As a first predetermined time period suited for the leakage determination condition, a short time of several ten seconds to several minutes mainly about leakage of a large flow rate or a long time of about two hours, etc., for example, if the leakage is 3 litters/h about leakage of a minute flow rate is used and a determination is made at the necessary timing required for safety check. Setting of the predetermined time period indicates the maximum condition and determination of the predetermined condition may be made in a shorter time period. It is preferable that unknown data can be determined at an earlier timing, needless to say.

Next, a gas leakage determination method will be discussed. Here, the operation for determining gas leakage based on stability of flow rate (change rate) is shown as one example of the gas leakage determination method. First, the determination operation of a gas appliance based on the change width of the flow rate value will be discussed and subsequently the gas leakage determination method using the change width of the flow rate value will be discussed.

Figure 14:
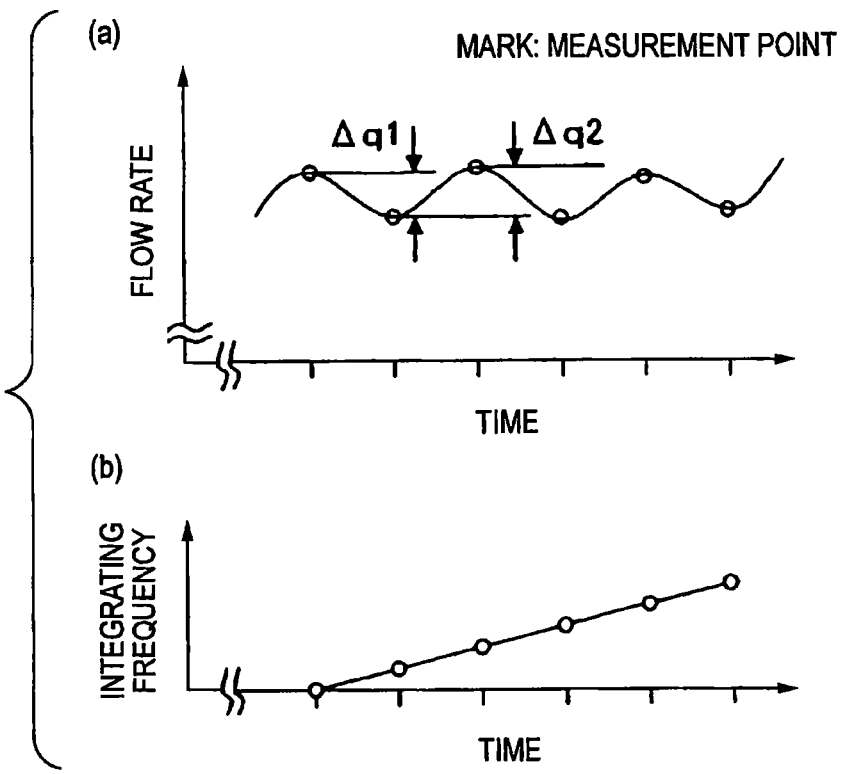
FIG. 14 is a drawing to show flow rate patterns for determining a gas appliance and leakage in the third embodiment of the invention.
Figure 15:
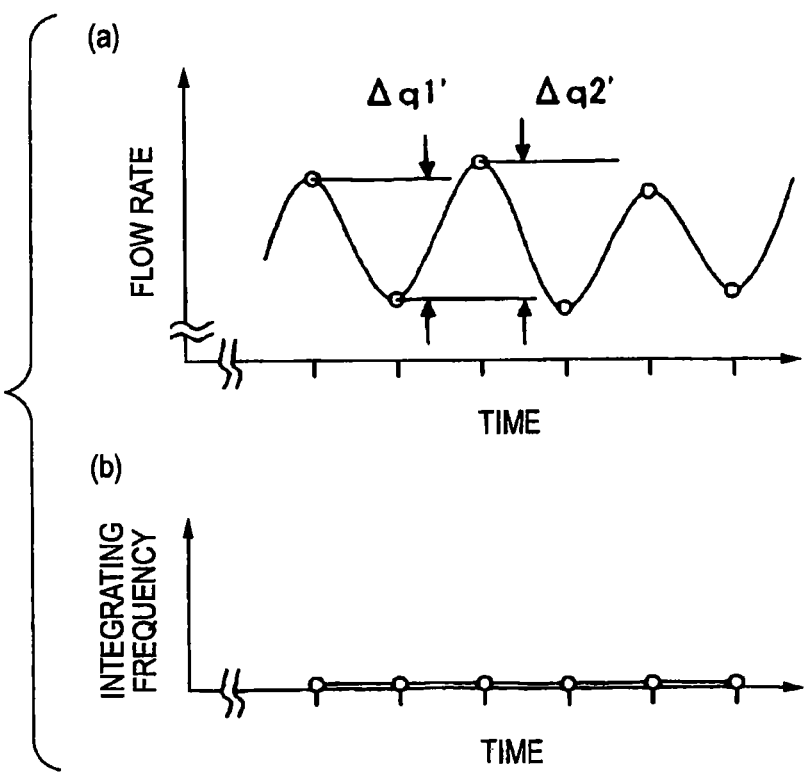
FIG. 15 is a drawing to show flow rate patterns for determining a gas appliance and leakage in the third embodiment of the invention.

FIGS. 14 and 15 show a determination example of a gas appliance using the measurement-by-measurement measurement flow rate value change width corresponding to the measurement flow rate value change for each measurement of the flow rate measurement unit 3. FIG. 14 shows an example wherein the measurement-by-measurement measurement flow rate value change width is smaller than (a predetermined threshold value), and FIG. 15 shows an example wherein the measurement-by-measurement measurement flow rate value change width is larger than (the predetermined threshold value).

FIG. 14, (a) shows a graph of the measurement time for each measurement of the flow rate measurement unit 3 and the obtained measurement flow rate value. Such combination data of the measurement time and the measurement flow rate value (target data) is stored in a flow rate information storage unit 8 of predetermined memory.

The computation unit 6 calculates the measurement flow rate value change width corresponding to the change amount of the measurement flow rate value within a predetermined time period. Particularly in the example, as the measurement flow rate value change width, the computation unit 6 calculates the change amount of the measurement flow rate value for each measurement of the flow rate measurement unit 3 (measurement-by-measurement measurement flow rate value change width) within the time period indicated by C. In FIG. 14, (a), the measurement-by-measurement measurement flow rate value change width is $\Delta q1, \Delta q2, \ldots, \Delta qi$.

The appliance determination unit 9 determines whether or not the measurement flow rate value change width is equal to or less than a predetermined threshold value $\Delta qm$, thereby determining the gas appliance using the gas. In the example, the appliance determination unit 9 determines that the above-mentioned measurement-by-measurement measurement flow rate value change width ($\Delta q1, \Delta q2, \ldots, \Delta qi$) is equal to or less than the predetermined threshold value $\Delta qm$, and determines the gas appliance based on the number of times the computation unit 6 has calculated the change width successively. The threshold value $\Delta qm$ is given as a proper change width for each gas appliance and is stored in memory (threshold value storage section) not shown.

FIG. 14, (b) is a graph showing the successive number of times the measurement-by-measurement measurement flow rate value change width smaller than the predetermined threshold value $\Delta qm$ has been calculated, obtained by the appliance determination unit 9 as the integrating frequency. FIG. 14, (b) shows that the measurement-by-measurement measurement flow rate value change width was equal to or less than the threshold value $\Delta qm$ five successive times in time period C ($|\Delta qi|<\Delta qm$). If the appliance determination unit 9 obtains the measurement-by-measurement measurement flow rate value change width equal to or less than the threshold value five successive times, the appliance determination unit 9 determines that the used gas appliance is a specific gas appliance (for example, a fan heater).

FIG. 15 is similar to FIG. 14; FIG. 15, (a) shows an example wherein measurement-by-measurement measurement flow rate value change width $\Delta q1', \Delta q2', \ldots, \Delta qi'$ calculated by the computation unit 6 is larger than $\Delta q1, \Delta q2, \ldots, \Delta qi$ in FIG. 14, (a), namely, an example wherein the variation in the gas flow rate value is large. Since the measurement-by-measurement measurement flow rate value change widths $\Delta q1', \Delta q2', \ldots, \Delta qi'$ are all larger than the threshold value $\Delta qm$ ($|\Delta qi'|\geq\Delta qm$), the integration frequency remains 0 as shown in FIG. 15, (b). If the appliance determination unit 9 obtains the measurement-by-measurement measurement flow rate value change width equal to or larger than the threshold value five successive times, the appliance determination unit 9 determines that the used gas appliance is a specific gas appliance (for example, a water heater).

In the examples in FIGS. 14 and 15, the appliance determination unit 9 determines the used gas appliance based on the successive number of times the measurement-by-measurement measurement flow rate value change width equal to or less than the threshold value has been obtained. In the description given above, the successive number of times is five, but is any desired number of times. The actual appliance operating time, namely, the predetermined time is long and the cases in FIGS. 14 and 15 may be mixed, in which case a determination may be made based on the rate therebetween.

Not only the successive number of times, but also any other index can be applied. For example, the appliance determination unit 9 may determine the used gas appliance based on the occurrence frequency of the measurement-by-measurement measurement flow rate value change width equal to or less than the predetermined threshold value. For example, an index may be used such that if six of ten change widths are equal to or less than the threshold value, the used gas appliance is a fan heater and that if only two change widths are equal to or less than the threshold value, the used gas appliance is a water heater.

Figure 16:
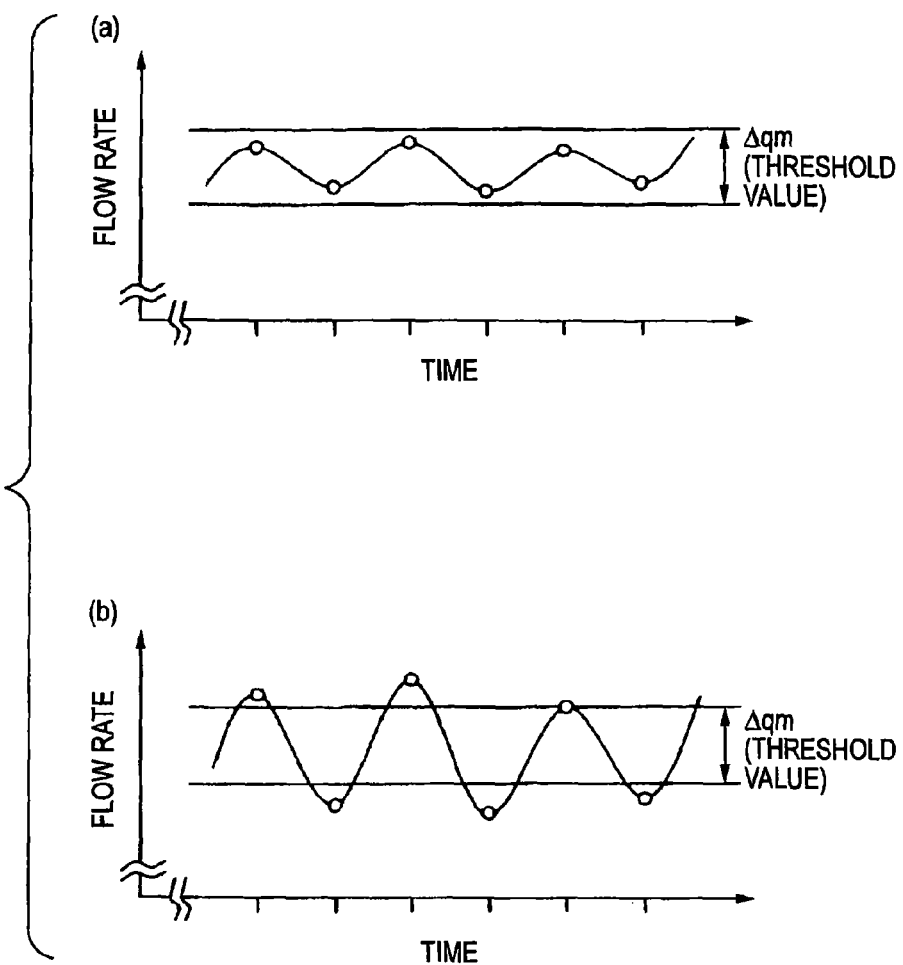
FIG. 16 is a drawing to show flow rate patterns for determining a gas appliance and leakage in the third embodiment of the invention.

FIG. 16 shows an example of using all time period measurement flow rate value change width corresponding to change amount in all of a predetermined time period (absolute value change amount), of measurement flow rate values during the stable operation of a gas appliance unlike the examples in FIGS. 14 and 15. That is, in the example in FIG. 16, the measurement flow rate values in all of predetermined time period B are stored in the flow rate information storage unit 8 and then all time period measurement flow rate value change widths $\Delta q$ of change widths of all measurement flow rate values are calculated by the computation unit 6.

If all time period measurement flow rate value change widths $\Delta q$ are smaller than the predetermined threshold value $\Delta qm$ as in FIG. 16, (a), for example, the appliance determination unit 9 determines that the used gas appliance is a specific gas appliance (for example, a fan heater). On the other hand, if all time period measurement flow rate value change widths Δq are larger than the predetermined threshold value Δqm as in FIG. 16, (b), for example, the appliance determination unit 9 determines that the used gas appliance is a specific gas appliance (for example, a water heater). The actual appliance operating time, namely, the predetermined time is long and the cases in FIG. 16, (a) and (b) may be mixed, in which case a determination may be made based on the rate therebetween.

In the examples in FIGS. 14 to 16, it is assumed that the time period during which the measurement flow rate value on which finding the change width is based is acquired is C, the time during the stable operation of a gas appliance. However, the time period may be any other partial time period from the operation start to the operation stop of a gas appliance. Further, the time period may be the time period from the operation start to the operation stop of a gas appliance.

Using the above-described measurement flow rate value change width, not only a gas appliance, but also the operating state of a specific gas appliance can be determined. For example, after a gas table starts to operate, although the gas appliance is the same of the gas table, the change width may vary as in FIGS. 14 and 15 between the case of normal combustion and the case of abnormal combustion (like incomplete combustion or going out). The change width may vary as in FIG. 16, (a) and (b). Such a change width variation is grasped, whereby it is made possible to determine whether or not the gas appliance operates normally or how the gas appliance operates. Such a determination can be applied to safety inspection of a gas appliance, for example.

Using the above-described measurement flow rate value change width, not only a gas appliance, but also gas leakage can be determined. For example, the change width may vary as in FIGS. 14 and 15 between the case where the gas appliance provides normal combustion and the case where gas leakage of almost the same flow rate as the gas appliance occurs. The change width may vary as in FIG. 16, (a) and (b). Such a change width variation is grasped, whereby it is made possible to determine whether the state is use of a gas appliance or occurrence of gas leakage. Generally, the case where the change width is small corresponds to leakage. In this case, the appliance determination unit 9 determines whether the state is use of a gas appliance or occurrence of gas leakage. Such a determination can be applied to safety inspection of gas leakage, for example.

In the embodiment, if an unknown flow rate pattern occurs, in determination of a predetermined condition, the determination of the predetermined condition described above is made, whereby discrimination of gas leakage is made possible. If gas leakage is determined, as instructed by the control circuit 11, safety processing for the gas leakage is performed as processing to handle the unknown data and a gas shut-off valve 2 is closed for shutting off the gas. Processing of sending a notification of gas leakage to the management center through a communication unit not shown is also possible. The flow rate pattern of gas leakage may be registered as an already known flow rate pattern. The situation of gas leakage is determined as the occurrence cause of unknown data and corresponding safety processing is performed, whereby safety at the gas using time can be secured.

Fourth Embodiment

A fourth embodiment shows the case where introduction of a new appliance is determined and corresponding processing of maintenance processing, etc., is performed as a second example of the situation of the occurrence cause of unknown data. In this case, a new appliance determination condition such as reproducibility based on the occurrence frequency of an unknown flow rate pattern is used as a second predetermined condition. As a second predetermined time period suited for the new appliance determination condition, a time period of about two weeks, etc., is used and a determination is made at the timing of sending a notification to the management center. Setting of the predetermined time period indicates the maximum condition and determination of the predetermined condition may be made in a shorter time period. It is preferable that unknown data can be determined at an earlier timing, needless to say.

Next, a determination method of a new appliance will be discussed. Here, the operation for determining introduction of a new appliance based on the number of times a new flow rate pattern of a new event has occurred is shown as an example of the determination method of a new appliance.

Figure 17:
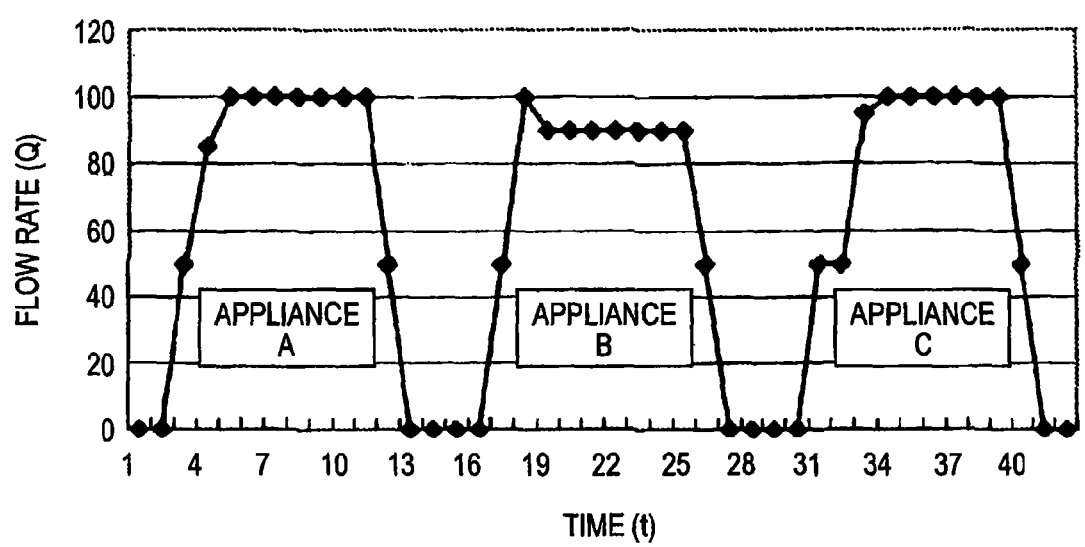
FIG. 17 is a drawing to show flow rate patterns for determining a new appliance in a fourth embodiment of the invention.

In the embodiment, the appliance determination unit 9 detects introduction of a new appliance as a gas appliance using a gas as a new event from the flow rate pattern measured by the flow rate measurement unit 3. Here, the expression "new appliance" contains not only a new appliance put onto the market (brand-new product) but also an appliance first introduced into the use environment of the flow rate measurement apparatus 1, such as in a household. FIG. 17 shows flow rate patterns when gas appliance A, gas appliance B, and gas appliance C are used. For example, if only the gas appliance A and the gas appliance B hitherto have been used and a new gas appliance other than the appliances is not used, a new flow rate pattern is not obtained and thus determination of a new event is not made.

Assume that use of gas appliance C is started as a new gas appliance. As shown in the graph of FIG. 17, the flow rate pattern of the gas appliance C differs from the flow rate patterns of the gas appliance A and the gas appliance B. Then, the appliance determination unit 9 detects introduction and use of the gas appliance C of a new appliance as a new event. In the example in FIG. 17, if one flow rate pattern of the new gas appliance C is obtained, the appliance determination unit 9 determines a new appliance. However, the determination based on only one flow rate pattern results in malfunction or erroneous detection caused by noise, etc., and it is feared that a new appliance may be determined although a new gas appliance is not introduced. Then, in an example shown in FIG. 18, when the flow rate pattern of the new gas appliance C has been obtained three times, it is determined that a new appliance is used. Accordingly, the possibility resulting in malfunction or erroneous detection can be decreased. The number of times the flow rate pattern has occurred, required here is not limited to three and can be set to a predetermined plurality of times.

Figure 18:
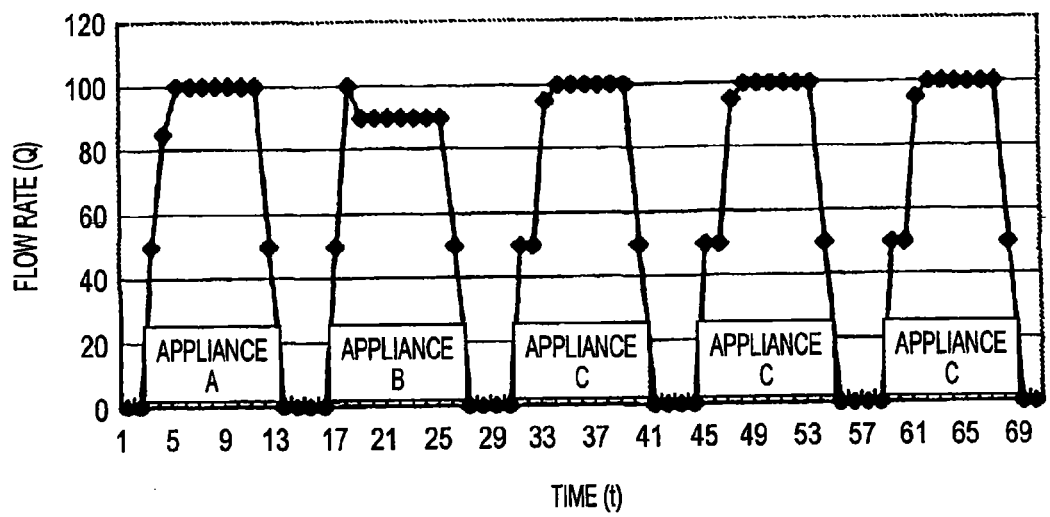
FIG. 18 is a drawing to show flow rate patterns for determining a new appliance in the fourth embodiment of the invention.
Figure 19:
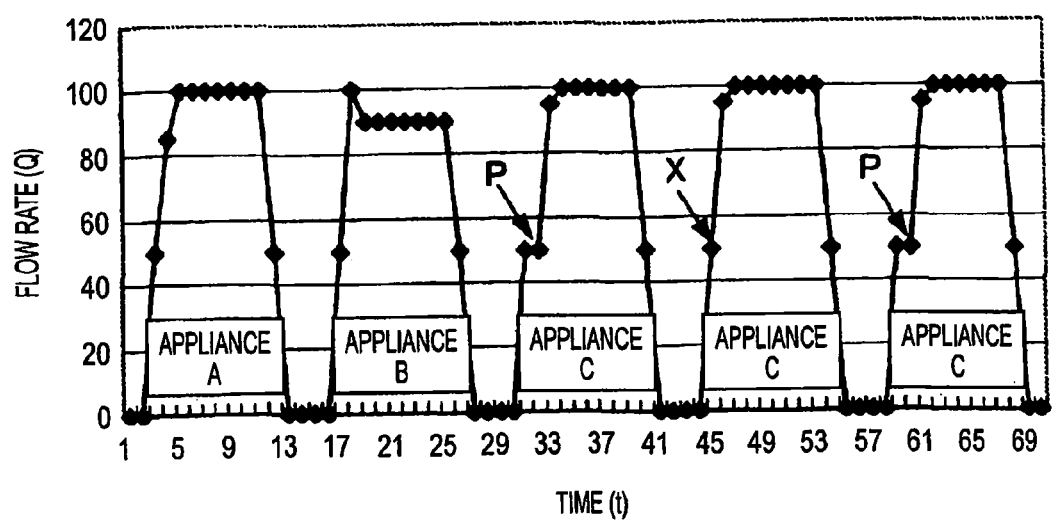
FIG. 19 is a drawing to show flow rate patterns for determining a new appliance in the fourth embodiment of the invention.

The example in FIG. 18 is the case where the flow rate pattern of the new gas appliance has been obtained successive times, namely, an example wherein any other pattern is not mixed between the flow rate patterns of the gas appliance C. However, if the flow rate pattern of the new gas appliance is not successively obtained, the use situation of a new appliance is also possible. For example, in an example in FIG. 19, the flow rate pattern of the gas appliance C should essentially be obtained three successive times, but a part where flow rate change is poor such as a loose ignition point P cannot be grasped because of the measurement timing of the flow rate measurement unit 3 in flow rate measurement in the second flow rate pattern. Thus, even if occurrence of the flow rate pattern of the gas appliance C is discontinuous, the appliance determination unit 9 may detect introduction of the new gas appliance C based on the two or more discontinuous flow rate patterns. Such a determination of a new gas appliance can be applied to maintenance, etc., in the management center or a gas meter, for example.

The occurrence frequency of an unknown flow rate pattern, etc., is used as the predetermined condition as described above, whereby introduction of a new appliance can be determined; an abnormal pattern is determined as for an unknown flow rate pattern and the situation of abnormal use such as improper use can also be determined. The abnormal use unit a use mode different from the normal specification, such as abnormal operation at the failure time of a gas appliance or improper operation of the operator. In combination with a CO sensor, it is also possible to determine a situation in which CO occurs as an unknown flow rate pattern and the CO sensor are used in association. In this case, as with gas leakage determination, gas is shut off and a notification is sent to the management center as safety processing.

In the embodiment, if an unknown flow rate pattern occurs, in determination of a predetermined condition, the determination of the predetermined condition described above is made, whereby it is made possible to detect introduction of a new appliance. If introduction of a new appliance is determined, as instructed by the control circuit 11, maintenance processing as for maintenance and management of the new appliance is performed as processing to handle the unknown data and a notification is sent to the management center and the new appliance is registered, etc. At this time, a notification of introduction of the new appliance is sent to the management center through a communication unit not shown. The flow rate measurement apparatus 1 stores and registers data of the flow rate pattern of the new appliance, etc., in the appliance registration storage unit 7 as instructed by the control circuit 11 of the apparatus or as instructed from the management center. Thus, the situation of introduction of the new appliance is determined as the occurrence cause of unknown data and corresponding maintenance processing is performed, whereby introduction of the new appliance can be grasped. As for the detected new appliance, integration processing of the gas flow rate by appliance or by function, etc., can also be performed.

Fifth Embodiment

A fifth embodiment shows the case where combined use of appliances is determined and corresponding processing of flow rate integration by appliance, etc., is performed as a third example of the situation of the occurrence cause of unknown data. In this case, a combined use determination condition such as a combination at the appliance use time is used as a third predetermined condition. As a third predetermined time period suited for the combined use determination condition, a time period of one month, etc., is used and a determination is made at the timing of calculating the gas use fee. Setting of the predetermined time period indicates the maximum condition and determination of the predetermined condition may be made in a shorter time period. It is preferable that unknown data can be determined at an earlier timing, needless to say.

Next, a determination method of combined use of appliances will be discussed. Here, the operation for determining combined use of appliances based on a combination of addition values of a start flow rate, comparison between a difference value on the minus side and a stop determination value, a flow rate control characteristic value, etc., is shown as an example of the determination method of combined use of appliances.

First, first determination logic of the appliance determination unit 9 concerning combined use of appliances will be discussed. When a plurality of gas appliances, for example, two gas appliances are started at the same time, etc., individual determination values by gas appliance are only stored in the appliance registration storage unit 7. Thus, if appliance determination processing is executed according to ordinary determination logic of making a comparison between the flow rate change amount, so-called difference value and start determination values stored in the appliance registration storage unit 7 for two appliances and making an appliance determination, it becomes impossible to determine the start gas appliance and the used gas appliance cannot be determined. Then, in the embodiment, started appliances in parallel are determined from a combination in which the magnitude of flow rate change indicated by the difference value between the flow rates every predetermined time, calculated by the computation unit 6 and the addition value of the registered start flow rates of the appliances match.

Figure 21:
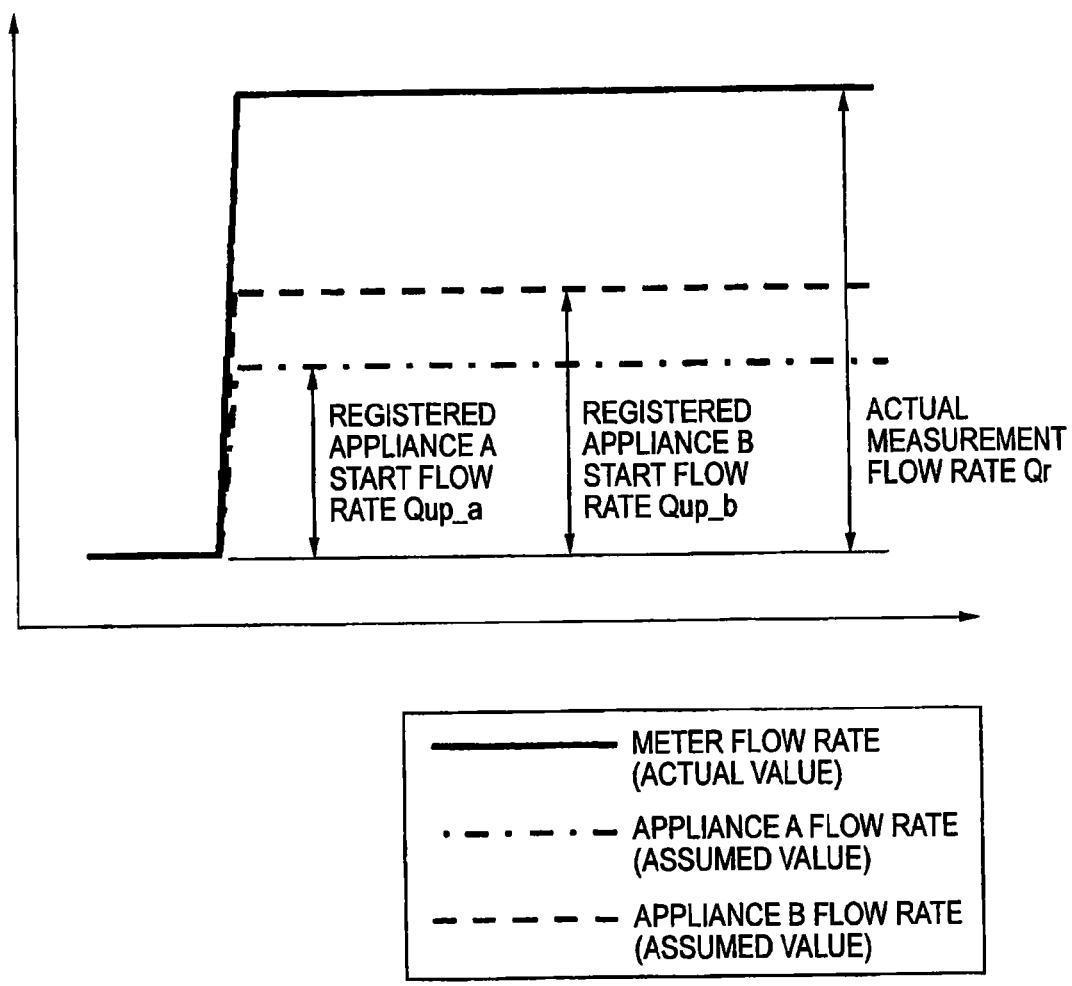
FIG. 21 is a drawing to show flow rate patterns for determining combined use in the fifth embodiment of the invention.

In the embodiment, registration data of used appliances is included as shown in FIG. 20, for example. At this time, when actual measurement flow rate of flow rate measurement unit 3 is Qr as shown in FIG. 21, for example, and registration of an appliance matching Qr does not exist at the time, if the registered start flow rates of registered appliances A and B are Qup_a and Qup_b and Qup_a+Qup_b=Qr, it is determined that the started appliances are the appliances A and B.

Thus, if flow rate change is detected and the used gas appliance cannot be determined in ordinary appliance determination processing of comparing the change amount Qr with the start determination values Qup_a and Qup_b stored in the appliance registration storage unit 7 and making a used gas appliance determination, it is handled as unknown data. At this time, determination logic different from the ordinary appliance determination processing, namely, processing of performing addition processing of the start determination values stored in the appliance registration storage unit 7 (Qup_a and Qup_b) and comparing the result with the change amount Qr is executed. Accordingly, if a plurality of gas appliances are started at the same time, the used gas appliances can be surely determined and the use accuracy of various services such as the safety function and a new fee menu based on appliance determination information can be enhanced, contributing greatly to expansion of the gas demand.

Although the case where the number of gas appliances started at the same time is two has been described in the embodiment, a similar determination can be made if three or more gas appliances are started at the same time, needless to say.

Next, second determination logic of the appliance determination unit 9 concerning combined use of appliances will be discussed. If it is impossible to determine the started gas appliances like the case where a plurality of gas appliances, for example, two gas appliances are started at the same time, as described above, the appliance determination unit 9 handles it as unknown data and determines combined use of appliances. At this time, when a difference on the minus side is detected from the output difference value of the computation unit 6, it is determined that any gas appliance stops, the difference value is compared with the stop determination value stored in the appliance registration storage unit 7, and which gas appliance was used is determined. In conjunction with this, the current gas appliance being used is determined from the flow rate measurement value measured in the flow rate measurement unit 3. Accordingly, the used gas appliance can be reliably determined under a condition in which a determination cannot be made in ordinary appliance determination like the case where a plurality of gas appliances are started at the same time.

Figure 22:
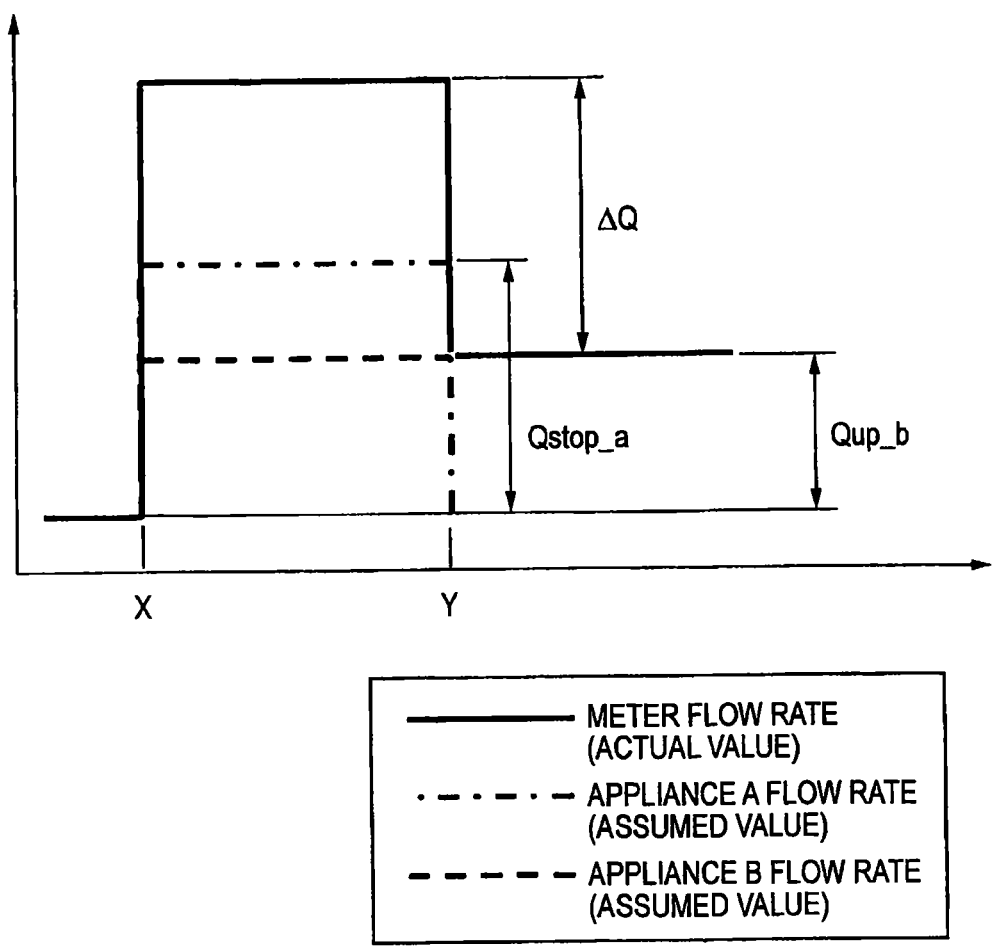
FIG. 22 is a drawing to show flow rate patterns for determining combined use in the fifth embodiment of the invention.

That is, as shown in FIG. 22, assuming that appliance A and appliance B are started at the same time and the appliance A stops earlier, flow rate change of the measurement flow rate at Y point in time becomes Δq. Since registered stop flow rate Qstop_a of the appliance A and Δq are almost equal, the appliance determination unit 9 determines that the appliance A stops and determines that as one unknown appliance, the appliance A was started at X point in time and stopped at the Y point in time. Since the use flow rate after the Y point in time and the start flow rate of the registered appliance B are almost equal, it is determined that another started appliance is the appliance B.

As another embodiment, when two or more gas appliances are started and the difference value and the determination value by appliance do not match, if a difference value on the minus side is detected from the output difference value of the computation unit 6, the appliance determination unit 9 makes a comparison between the difference value on the minus side and the stop determination value stored in the appliance registration storage unit 7. If the comparison result is a mismatch, it is determined that a plurality of gas appliances stop at the same time, compares the value with the addition value of the stop determination values stored in the appliance registration storage unit 7, and finds out the addition value of the stop determination values close to the difference value on the minus side. Accordingly, the gas appliances stopped at the same time can be determined and the used gas appliance can be reliably determined under a condition in which a determination cannot be made in ordinary appliance determination.

Next, third logic of the appliance determination unit 9 concerning combined use of appliances will be discussed. If it is impossible to determine the started gas appliances like the case where two gas appliances are started at the same time, as described above, the appliance determination unit 9 handles it as unknown data and determines combined use of appliances. At this time, if an appliance having a flow rate control function is contained, in addition to the appliance determination logic using the change value of the flow rate, the flow rate control characteristic is previously registered in the appliance registration storage unit 7 as a control registration value and is used to determine combined use. Accordingly, it is made possible to determine the use gas appliance from the flow rate waveform pattern proper to each appliance, found from the instantaneous flow rate value measured in the flow rate measurement unit 3.

Figure 23:
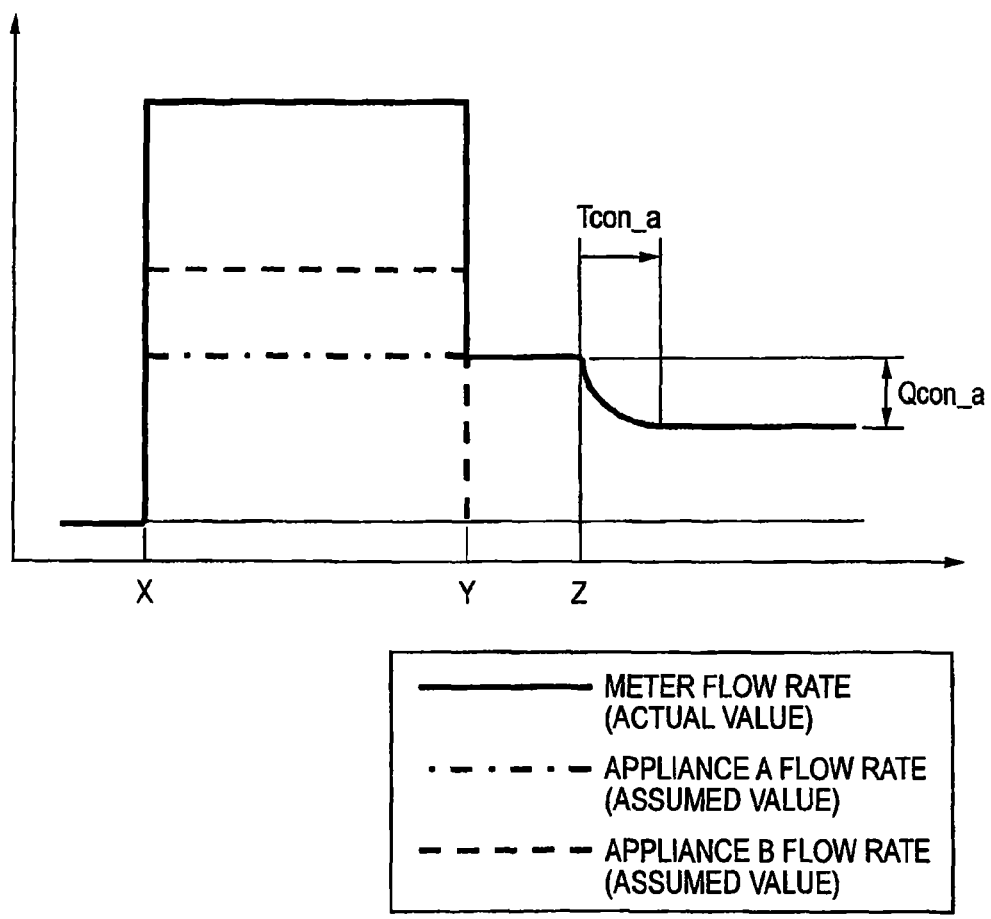
FIG. 23 is a drawing to show flow rate patterns for determining combined use in the fifth embodiment of the invention.

That is, as shown in FIG. 23, assuming that the appliance A and the appliance B are started at the same time, if flow rate change as occurring at Z point in time (change time is Tcon_a and change flow rate is Qcon_a) is registered as control change of the appliance A, it can be checked that the appliance A operates at the point in time. Accordingly, it can be determined that the appliance A is started from X point in time.

In the embodiment, if an unknown flow rate pattern occurs, in determination of a predetermined condition, the determination of the predetermined condition described above is made, whereby it is made possible to identify combined use of gas appliances. If combined use is determined, as instructed by a control circuit 11, a by-appliance flow rate integration unit 15 performs integration processing of the gas flow rate by appliance, by function, etc., at the combined use time corresponding to combined use processing as processing to handle the unknown data. The flow rate pattern at the combined use time may be registered in the appliance registration storage unit 7. Thus, the situation of combined use of the appliances is determined as the occurrence cause of unknown data and corresponding by-appliance processing is performed as the combined use processing, whereby flow rate integration of the individual gas appliances at the combined use time is made possible and can be used for arbitrary fee calculation by appliance and by function, etc., according to the setting of the gas company. To calculate such an appliance-based fee and such a function-based fee, a fee computation unit for individual flow rates may be provided. For example, as one of examples of services that can be provided, it is considered that a discount system is applied only to heating appliances, etc., as a new gas fee system and it is also made possible to lead to expansion of the gas demand and an increase in the sale of appliances of the gas company.

To make a determination according to the predetermined condition of the data determining an unknown appliance in the third to fifth embodiments described above, when gas leakage is determined as in the third embodiment, if it does not apply to any other predetermined condition such as introduction of a new appliance or combined use, it is also possible to determine leakage.

If it does not apply to any predetermined condition in the third to fifth embodiments described above, when the flow rate data of the registered appliance is rechecked and is similar to registered flow rate pattern, it is also possible to determine that it is caused by secular change. In this case, the flow rate data of the registered appliance can be corrected and the user or a management center may be informed of the fact at the maintenance timing of the appliance for prompting the user, etc., to adjust, repair, replace, etc., the used appliance.

As a result of making a determination according to the predetermined condition of the data determining an unknown appliance, if it does not meet any condition, it is also possible to determine a possibility of tampering or an unexpected use situation in the gas appliance or the gas flow path. In this case, a notification of the abnormal state can be sent to the management center and the user may be alerted to the abnormal state.

It is to be understood that the invention is not limited to the items shown in the embodiments and the invention is also intended for those skilled in the art to make modifications and application based on the description of the invention and well-known arts and the modifications and the application are contained in the scope to seek protection.

While the invention has been described in detail with reference to the specific embodiments, it will be obvious to those skilled in the art that various changes and modifications can be made without departing from the spirit and the scope of the invention.

This application is based on Japanese Patent Application (No. 2006-354265) filed on Dec. 28, 2006, which is incorporated herein by reference.

Industrial Applicability

As described above, the flow rate measurement apparatus according to the invention can enhance the accuracy of appliance determination, so that a new fee menu, etc., provided by the gas company, the water supply company, etc., can be used and the apparatus can be used for the safety function and appliance maintenance using the appliance determination information.

The invention claimed is:

1. A flow rate measurement apparatus comprising:
a flow rate measurement unit for measuring a flow rate of a fluid flowing into a flow path;
a flow rate information storage unit for storing a flow rate value measured in the flow rate measurement unit;
an appliance registration storage unit for storing the flow rate value for each appliance of a plurality of appliances;
an appliance determination unit for making a comparison between a flow rate pattern of the flow rate value measured in the flow rate measurement unit and a flow rate pattern of an appliance determination value stored in the appliance registration storage unit and determining a use state of an appliance connected to a downstream side of the flow rate measurement unit solely from the flow rate value; and an unknown appliance registration unit for registering the use state as unknown data when there is a flow rate pattern according to which the appliance determination unit cannot determine the appliance based on information in the appliance registration storage unit; and a recheck unit for rechecking the unknown data based on the data in the flow rate information storage unit to determine if registration data exists in the unknown appliance registration unit.

2. The flow rate measurement apparatus as claimed in claim 1 comprising a by-appliance flow rate calculation unit for calculating the flow rate for each appliance of the plurality of appliances based on the determination result of said appliance determination unit.

3. The flow rate measurement apparatus as claimed in claim 1 wherein the unknown appliance registration unit registers the flow rate pattern resulting in the unknown appliance in the appliance registration storage unit as a new appliance.

4. The flow rate measurement apparatus as claimed in claim 1, wherein the recheck unit rechecks the unknown data each time the information in the unknown appliance registration unit is newly updated.

5. The flow rate measurement apparatus as claimed in claim 1 wherein the recheck unit rechecks the unknown data when registration data exists in the unknown appliance registration unit and the flow rate value output from the flow rate measurement unit has substantially a zero value.

6. The flow rate measurement apparatus as claimed in claim 1, wherein the recheck unit rechecks the unknown data every given time when registration data exists in the unknown appliance registration unit.

7. The flow rate measurement apparatus as claimed in claim 1, wherein the flow rate information storage unit comprises an information compression unit for compressing information of the flow rate value in a time axis direction and storing the compressed information.

8. The flow rate measurement apparatus as claimed in claim 1, wherein the flow rate measurement unit includes an instantaneous flow rate measurement unit comprising an ultrasonic flowmeter.

9. A gas supply system comprising a flow rate measurement apparatus according to claim 1 and connected to a household gas supplying pipe line.

10. A flow rate measurement apparatus comprising:
a flow rate measurement unit for measuring a flow rate of a fluid flowing into a flow path;
a flow rate information storage unit for storing a flow rate value measured in the flow rate measurement unit;
an appliance registration storage unit for storing the flow rate value for each appliance of a plurality of appliances;
an appliance determination unit for making a comparison between a flow rate pattern of the flow rate value measured in the flow rate measurement unit and a flow rate pattern of an appliance determination value stored in the appliance registration storage unit and determining a use state of an appliance connected to a downstream side of the flow rate measurement unit solely from the flow rate value;
an unknown appliance registration unit for registering the use state as unknown data when there is a flow rate pattern according to which the appliance determination unit cannot determine an appliance based on information in the appliance registration storage unit;

a recheck unit for rechecking the unknown data based on the data in the flow rate information storage unit to determine if registration data exists in the unknown appliance registration unit; and a correspondence processing determination unit for determining the unknown data for a predetermined time period under a predetermined condition and determining correspondence processing procedures.

11. The flow rate measurement apparatus as claimed in claim 10, wherein the correspondence processing determination unit uses a determination condition corresponding to each occurrence cause of a specific use state as the predetermined condition and determines the unknown data in a predetermined time period suited for each determination condition.

12. The flow rate measurement apparatus as claimed in claim 10, wherein the correspondence processing determination unit uses a leakage determination condition as a first predetermined condition and includes a leakage determination unit for determining leakage of a fluid in the flow rate pattern of the unknown data in a first predetermined time period suited for the leakage determination condition and determines safety processing as the correspondence processing procedure when the leakage is determined.

13. The flow rate measurement apparatus as claimed in claim 10, wherein the flow rate information storage unit comprises an information compression unit for compressing information of the flow rate value in a time axis direction and storing the compressed information.

14. The flow rate measurement apparatus as claimed in claim 10, wherein the flow rate measurement unit includes an instantaneous flow rate measurement unit comprising an ultrasonic flowmeter.

15. A gas supply system comprising a flow rate measurement apparatus according to claim 10 and connected to a household gas supplying pipe line.

16. A flow rate measurement apparatus comprising:
a flow rate measurement unit for measuring a flow rate of a fluid flowing into a flow path;
a flow rate information storage unit for storing a flow rate value measured in the flow rate measurement unit;
an appliance registration storage unit for storing the flow rate value for each appliance of a plurality of appliances;
an appliance determination unit for making a comparison between a flow rate pattern of the flow rate value measured in the flow rate measurement unit and a flow rate pattern of an appliance determination value stored in the appliance registration storage unit and determining a use state of an appliance connected to a downstream side of the flow rate measurement unit solely from the flow rate value;
an unknown appliance registration unit for registering the use state as unknown data when there is a flow rate pattern according to which the appliance determination unit cannot determine an appliance based on information in the appliance registration storage unit; and
a correspondence processing determination unit for determining the unknown data for a predetermined time period under a predetermined condition and determining correspondence processing procedures,
wherein the correspondence processing determination unit uses a new appliance determination condition as a second predetermined condition and includes a new appliance determination unit for determining a new appliance in the flow rate pattern of the unknown data in a second predetermined time period suited for the new appliance determination condition and determines maintenance processing as the correspondence processing procedure when the new appliance is determined.

17. The flow rate measurement apparatus as claimed in claim 16, wherein the correspondence processing determination unit uses a combined use determination condition as a third predetermined condition and includes a combined use determination unit for determining combined use of appliances in the flow rate pattern of the unknown data in a third predetermined time period suited for the combined use determination condition and determines combined use processing as the correspondence processing procedure when the combined use is determined.

* * * * *